United States Patent
Kakizaki et al.

(10) Patent No.: US 11,720,313 B2
(45) Date of Patent: Aug. 8, 2023

(54) DISPLAY SYSTEM, DISPLAY METHOD AND PROGRAM

(71) Applicant: SEIKO EPSON CORPORATION, Tokyo (JP)

(72) Inventors: Yuichi Kakizaki, Ueda (JP); Hiroaki Baba, Nagano (JP); Shinya Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/488,105

(22) Filed: Sep. 28, 2021

(65) Prior Publication Data
US 2022/0100456 A1 Mar. 31, 2022

(30) Foreign Application Priority Data
Sep. 29, 2020 (JP) ................................. 2020-163820

(51) Int. Cl.
*G06F 3/14* (2006.01)
*G06T 7/70* (2017.01)
*G02B 27/01* (2006.01)

(52) U.S. Cl.
CPC ....... *G06F 3/1423* (2013.01); *G02B 27/0172* (2013.01); *G06T 7/70* (2017.01); *G02B 2027/014* (2013.01); *G02B 2027/0138* (2013.01); *G02B 2027/0178* (2013.01); *G06T 2207/30244* (2013.01)

(58) Field of Classification Search
CPC ..... G06F 3/1423; G06T 7/70; G02B 27/0172; G02B 2027/0138; G02B 2027/014; G02B 2027/0178
See application file for complete search history.

(56) References Cited

U.S. PATENT DOCUMENTS

| 2017/0011555 | A1* | 1/2017 | Li ............................. G06T 7/30 |
| 2019/0196185 | A1 | 6/2019 | Kimura |
| 2020/0273432 | A1 | 8/2020 | Kobayashi |
| 2021/0185294 | A1* | 6/2021 | Malaika ................. G06F 3/011 |

FOREIGN PATENT DOCUMENTS

| CN | 111600990 A | 8/2020 |
| JP | 2017-108370 A | 6/2017 |
| JP | 2019-114050 A | 7/2019 |

* cited by examiner

*Primary Examiner* — Robert J Michaud
(74) *Attorney, Agent, or Firm* — Oliff PLC

(57) ABSTRACT

A display system includes an HMD mounted on a head of a user, and a control device coupled to the HMD, the HMD includes an image display unit, with an outside scene being visible, for displaying a display image overlapping the outside scene, and a main control unit for causing an image display unit to display a display image, and the control device includes a touch panel, and a CO control unit for causing a related image related to a display content of the display image to be displayed on the touch panel.

8 Claims, 14 Drawing Sheets

DISPLAY SYSTEM, DISPLAY METHOD AND PROGRAM

The present application is based on, and claims priority from JP Application Serial Number 2020-163820, filed Sep. 29, 2020, the disclosure of which is hereby incorporated by reference herein in its entirety.

BACKGROUND

1. Technical Field

The present disclosure relates to a display system, a display method, and a program.

2. Related Art

In the past, a configuration in which a display device is coupled to an information processing device has been known. For example, JP 2019-114050 A discloses a technology in which a display image of an information processing device is displayed on a display device, and a display image of the information processing device is switched to a user interface display.

However, further improvements in user visibility by coordinating images displayed on two display units.

SUMMARY

An aspect for solving the above-described problem is a display system including a display device that is mounted on a head of a user, the display device that includes: a first display unit displaying a first image and transmitting an outside light and a first control unit causing the first display unit to display the first display image, and an information processing device that is coupled to the display device, the information processing device that includes: a second display unit and a second control unit causing the second display unit to display a second image related to a display content of the first image.

An aspect for solving the above-described problem is a display method performed by a display system including a display device mounted on a head of a user, and including a first display unit for displaying a display image with an outside scene visible, and an information processing device coupled to the display device, the display method including a step of causing the first display unit to display the display image, in the display device, and a step of causing a second display unit included in the information processing device to display a related image related to a display content of the display image, in the information processing device.

An aspect for solving the above-described problems is a non-transitory computer-readable storage medium storing a program executed by a computer, the computer being installed on each of a display device mounted on a head of a user, and including a first display unit for displaying a display image with an outside scene visible, and an information processing device coupled to the display device, the program causing the computer to perform a procedure for causing first display unit to display the display image, in the display device, and to perform a procedure for causing a second display unit included in the information processing device to display a related image related to a display content of the display image, in the information processing device.

DESCRIPTION OF EXEMPLARY EMBODIMENTS

First Exemplary Embodiment

A. System Configuration

A first exemplary embodiment to which the present disclosure is applied will be described below with reference to the accompanying drawings.

Figure 1:
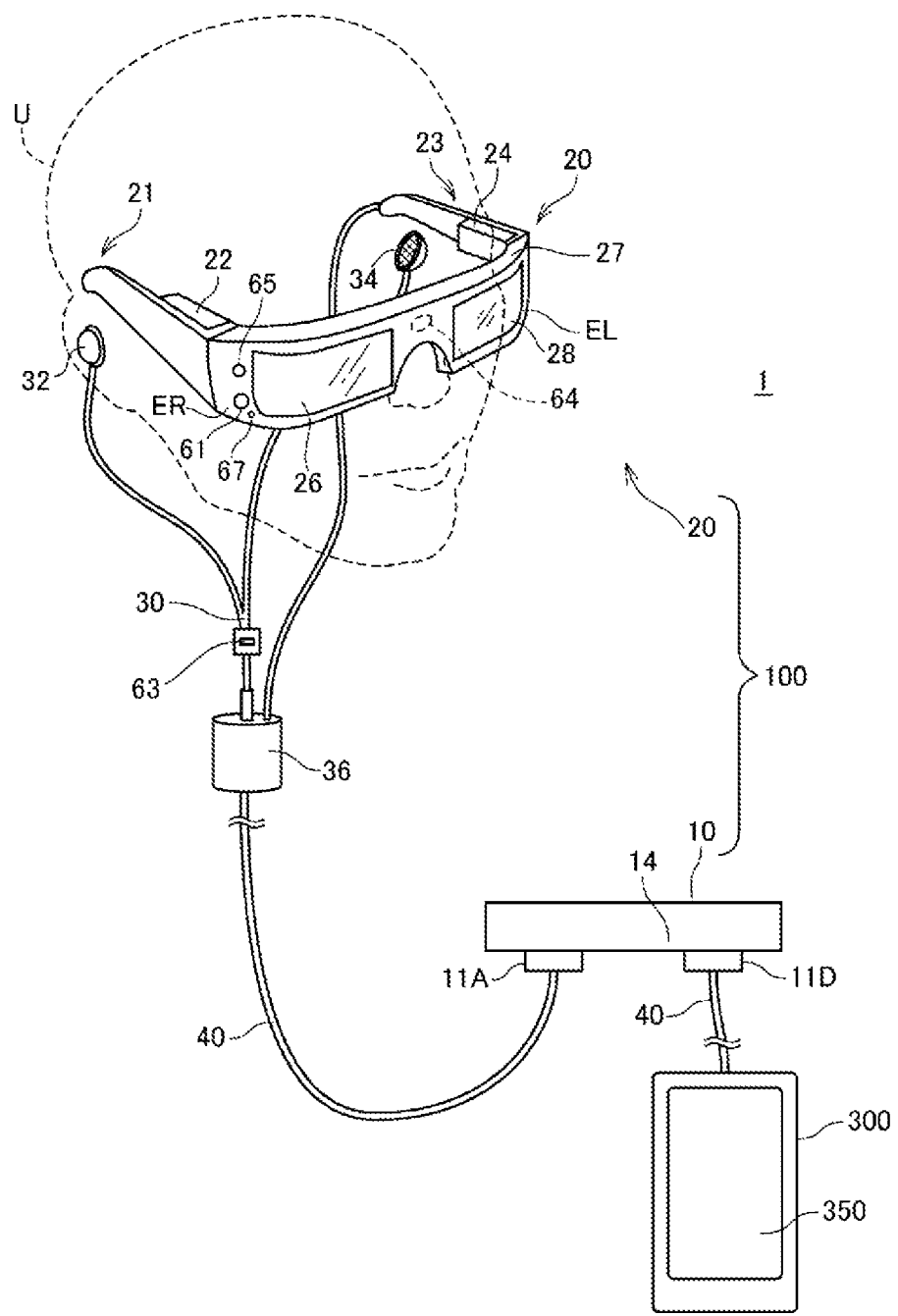
FIG. 1 is a diagram illustrating a schematic configuration of a display system.

FIG. 1 is a diagram illustrating a schematic configuration of a display system 1.

The display system 1 includes an HMD 100 and a control device 300. The HMD 100 is a head-mounted display apparatus including an image display unit 20 mounted on a head of a user U, and causing the user U to visually recognize an image or video, and is an example of a display device of the present disclosure. HMD is an abbreviation for Head Mounted Display. The control device 300 is an example of an information processing device of the present disclosure. The image display unit 20 is an example of a first display unit of the present disclosure.

The HMD 100 includes a connection device 10 coupled to the image display unit 20. The connection device 10 functions as an interface for coupling the HMD 100 to a device different from the HMD 100. In the display system 1, the control device 300 is coupled to the connection device 10.

In the following description and drawings, for the sake of convenience of description, a prefix DP is added to a name of each of some functional units constituting the HMD 100, and a prefix CO is added to a name of each of some functional units constituting the control device 300.

The control device 300 is provided with a display screen that displays characters and images, and a touch panel 350 that functions as an operating unit for detecting touch operations and pressing operations, and is a portable size terminal device, and for example, a smart phone can be used. The touch panel 350 is constituted by a display panel and a touch sensor 336. LCD is an abbreviation for Liquid Crystal Display. The control device 300 may be a desktop personal computer, a notebook personal computer, a tablet personal computer, or the like.

The connection device 10 includes a connector 11A and a connector 11D on a box shaped case. The image display unit 20 is coupled to the connector 11A via a coupling cable 40, and the control device 300 is coupled to the connector 11D via a USB cable 46. As a result, the image display unit 20 and the control device 300 are coupled to each other so that data can be transmitted and received. For example, the control device 300 outputs video data and sound data for the image display unit 20 to display video to the image display unit 20. For example, the image display unit 20 transmits detection data of various sensors included in the image display unit 20 to the control device 300, as described below. The control device 300 may be capable of supplying power to the image display unit 20. USB is an abbreviation for Universal Serial Bus.

The configuration of coupling the connection device 10 and the control device 300 using the USB cable 46 is merely an example, and a specific coupling form of the connection device 10 and the control device 300 is not limited. For example, other types of cables may be used for wired coupling or coupling via wireless communication may be used. For example, in a configuration in which the USB cable 46 is coupled to the connector 11D of a USB-TypeC standard, 20 volts DC current can be supplied by the USB cable 46, and HDMI standard video data or the like can be transmitted as a function of an alternate mode of USB-TypeC standard. HDMI and MHL are registered trademarks.

The image display unit 20 includes a main body including a right holding part 21, a left holding part 23, and a front frame 27. The main body further includes a right display unit 22, a left display unit 24, a right light-guiding plate 26, and a left light-guiding plate 28.

The right holding part 21 and the left holding part 23 extend rearward from corresponding ends of the front frame 27, to hold the image display unit 20 on the head of the user U. The right holding part 21 is coupled to an end portion ER located on a right side of the user U in the front frame 27, and the left holding part 23 is coupled to an end portion EL located on a left side of the user U.

The right light-guiding plate 26 and the left light-guiding plate 28 are provided on the front frame 27. The right light-guiding plate 26 is located in front of the right eye of the user U in a state where the user U wears the image display unit 20, and causes the user U to visually recognize an image with the right eye. The left light-guiding plate 28 is located in front of the left eye of the user U in a state where the user U wears the image display unit 20, and causes the user U to visually recognize an image with the left eye. The right light-guiding plate 26 and the left light-guiding plate 28 are optical units formed of a light transmissive resin or the like, and are configured to guide imaging light output by the right display unit 22 and the left display unit 24 to the eyes of the user U. The right light-guiding plate 26 and the left light-guiding plate 28 are, for example, prisms.

The front frame 27 has a shape formed by coupling an end of the right light-guiding plate 26 and an end of the left light-guiding plate 28 to each other, and this coupling position corresponds to a position between eyebrows of the user U in a state where the user U wears the image display unit 20. The front frame 27 may include a nose pad abutting the nose of the user U in a state where the user U wears the image display unit 20, and may be configured to couple a belt to the right holding part 21 and the left holding part 23 to hold the image display unit 20 to the head of the user U by the belt.

Each of the right display unit 22 and the left display unit 24 is a module obtained by unitizing an optical unit and a peripheral circuit. The right display unit 22 causes an image to be displayed by the right light-guiding plate 26, and the left display unit 24 causes an image to be displayed by the left light-guiding plate 28. The right display unit 22 is provided at the right holding part 21 and the left display unit 24 is provided at the left holding part 23.

Imaging light guided by the right light-guiding plate 26 and outside light transmitted through the right light-guiding plate 26 are incident on the right eye of the user U. Similarly, the imaging light guided by the left light-guiding plate 28 and the outside light transmitted through the left light-guiding plate 28 are incident on the left eye. The imaging light from the right light-guiding plate 26 and the left light-guiding plate 28 and the outside light transmitted through the right light-guiding plate 26 and the left light-guiding plate 28 are incident on the eyes of the user U. As a result, the user U visually recognizes an image displayed by the image display unit 20 overlapping an outside scene transmitted through the right light-guiding plate 26 and the left light-guiding plate 28.

A DP illuminance sensor 65 is arranged on the front frame 27. The DP illuminance sensor 65 is a sensor configured to receive outside light coming from in front of the user U wearing the image display unit 20. The DP illuminance sensor 65 can detect illuminance and an amount of outside light transmitted through the right light-guiding plate 26 and the left light-guiding plate 28 and incident on the eye of the user U.

A DP outer camera 61 corresponds to an imaging unit of the present disclosure. The DP outer camera 61 is provided at the front frame 27 and positioned so that the DP outer camera 61 does not block the outside light passing through the right light-guiding plate 26 and the left light-guiding plate 28. The DP outer camera 61 is a digital camera including an image capturing element such as a CCD or a CMOS, an image capturing lens, and the like, and may be a monocular camera or a stereo camera. An angle of view of the DP outer camera 61 includes at least a part of a range of the outside scene that the user U wearing the image display unit 20 visually recognizes through the right light-guiding plate 26 and the left light-guiding plate 28. The DP outer camera 61 may be a wide angle camera, or may be capable of capturing the entire outside scene visually recognized by the user U wearing the image display unit 20. CCD is an abbreviation for Charge Coupled Device, and CMOS is an abbreviation for Complementary Metal Oxide Semiconductor.

An LED indicator 67 that lights up during operation of the DP outer camera 61 is arranged on the front frame 27.

The front frame 27 includes a distance sensor 64 that detects a distance between a measurement target object located in a predetermined measurement direction and the front frame 27. The distance sensor 64 is, for example, a light reflective distance sensor using an LED, a laser diode, or the like, an infrared depth sensor, an ultrasonic distance sensor, or a laser range scanner. The distance sensor 64 may be a distance detection unit that combines image detection and sound detection, or a device that processes images obtained by stereo imaging by a camera to detect a distance. The measurement direction of the distance sensor 64 is, for example, a direction of the outside scene visually recognized by the user U through the right light-guiding plate 26 and the left light-guiding plate 28.

Each of the right display unit 22 and the left display unit 24 is coupled with the connection device 10 by the coupling cable 40. The coupling cable 40 includes an audio connector 36. A headset 30 including a right earphone 32 and a left earphone 34 constituting a stereo headphone, and a microphone 63, is coupled to the audio connector 36. The right earphone 32 and the left earphone 34 output a sound based on a sound signal output from the connection device 10. The microphone 63 is configured to collect a sound and outputs a sound signal to the connection device 10.

B. Configuration of Optical System of Image Display Unit

Figure 2:
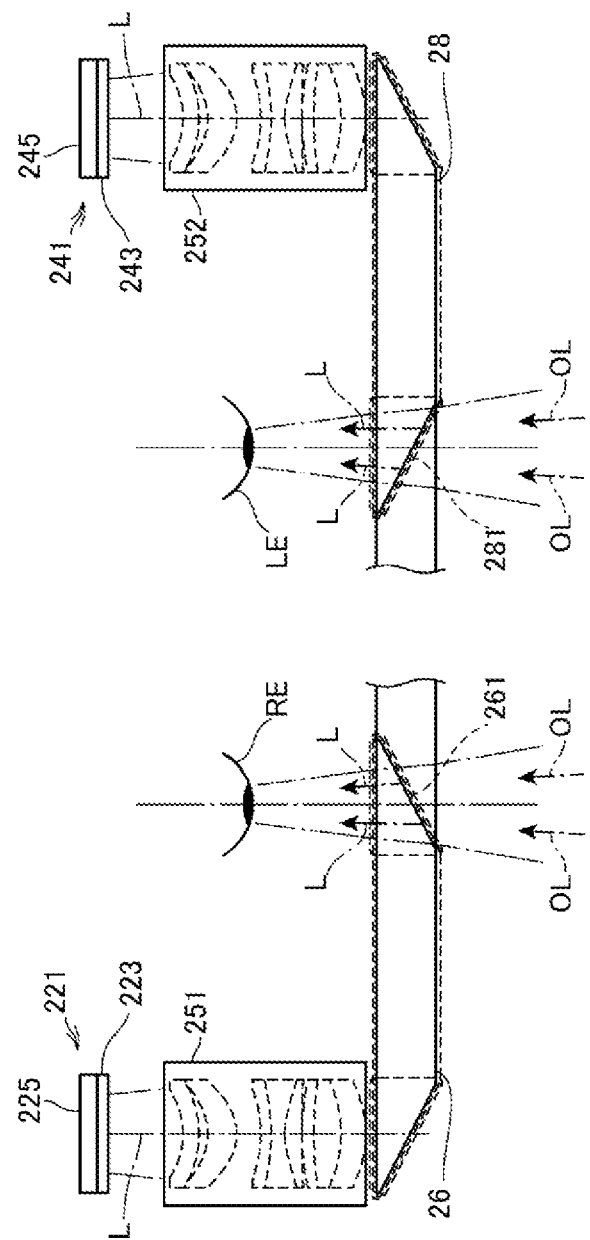
FIG. 2 is a main part plan view illustrating a configuration of an optical system of an image display unit.

FIG. 2 is a plan view illustrating a main part of a configuration of an optical system of the image display unit 20. In FIG. 2, a left eye LE and a right eye RE of the user U are illustrated for explanation.

The right display unit 22 and the left display unit 24 are configured to be left-right symmetrical, for example.

As a configuration in which the right eye RE is caused to visually recognize an image, the right display unit 22 includes an OLED unit 221 configured to emit imaging light, and a right optical system 251 configured to guide imaging light L emitted by the OLED unit 221 to the right light-guiding plate 26. OLED is an abbreviation for Organic Light Emitting Diode.

Figure 3:
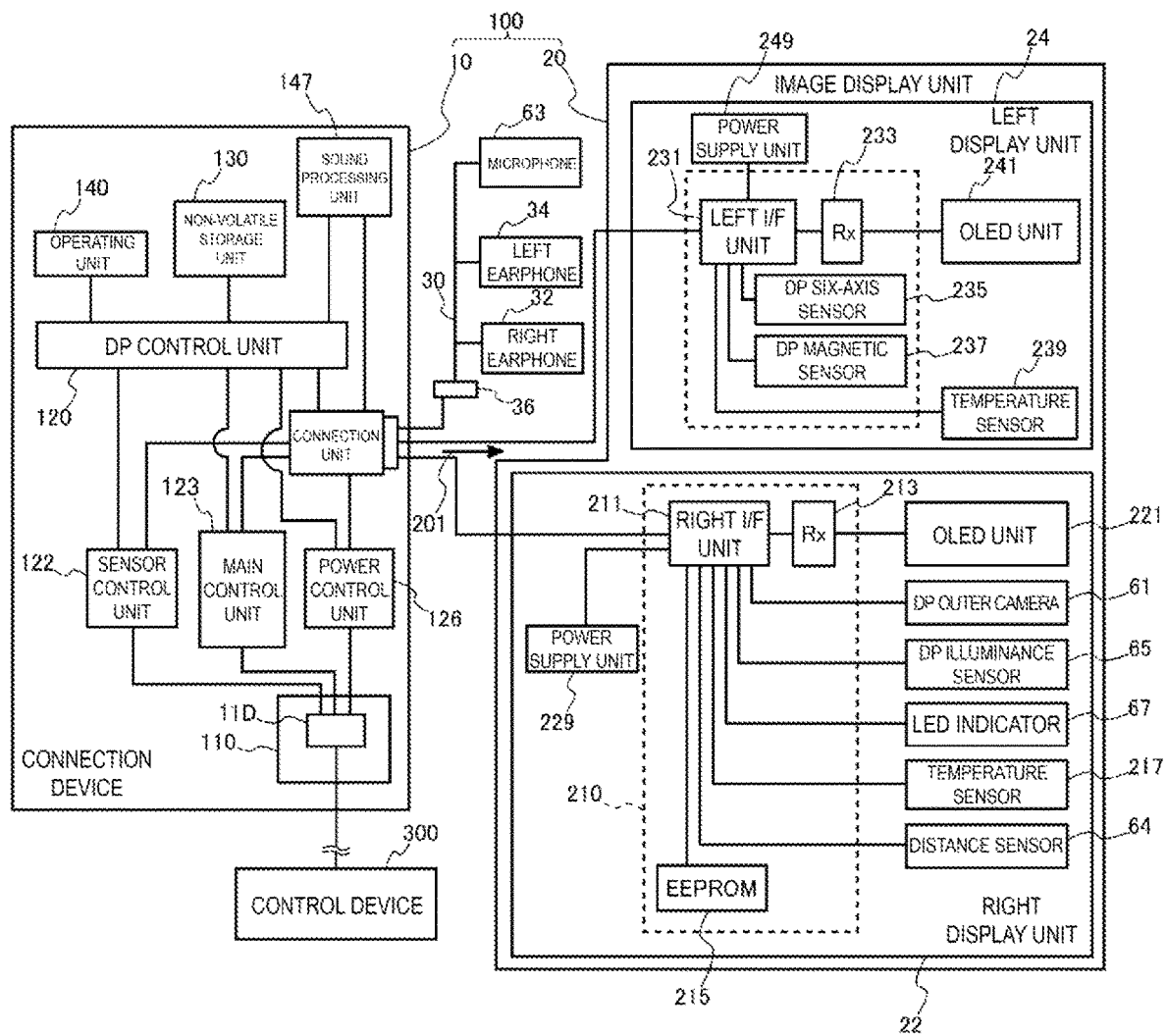
FIG. 3 is a block diagram of the display system.

The OLED unit 221 includes an OLED panel 223 and an OLED drive circuit 225 configured to drive the OLED panel 223. The OLED panel 223 is, for example, a self-light emission type display panel in which light-emitting elements configured to emit color light of R, G, and B respectively are arranged. The OLED drive circuit 225 drives the OLED panel 223 in accordance with control of a DP control unit 120. The OLED drive circuit 225 is mounted on a substrate (not illustrated) secured to a back surface of the OLED panel 223, for example, and a temperature sensor 217 illustrated in FIG. 3 is mounted to the substrate.

The right optical system 251 converts, by a collimate lens, the imaging light L emitted from the OLED panel 223 into luminous flux in a parallel state, and causes the imaging light L to be incidence on the right light-guiding plate 26. The imaging light L is reflected by a plurality of reflection surfaces within the right light-guiding plate 26, reflected by a half mirror 261 located in front of the right eye RE, and emitted from the right light-guiding plate 26 toward the right eye RE.

As a configuration in which the left eye LE is caused to visually recognize an image, the right display unit 22 includes an OLED unit 241 configured to emit imaging light, and a left optical system 252 configured to guide the imaging light L emitted by the OLED unit 241 to the left light-guiding plate 28.

The OLED unit 241 includes an OLED panel 243, and an OLED drive circuit 245 configured to drive the OLED panel 243. The OLED panel 243 is, for example, a self-light emission type display panel in which light-emitting elements configured to emit color light of R, G, and B respectively are arranged. The OLED drive circuit 245 drives the OLED panel 243 in accordance with control of the DP control unit 120. The OLED drive circuit 245 is mounted on a substrate (not illustrated) secured to a back surface of the OLED panel 243, for example, and a temperature sensor 239 illustrated in FIG. 3 is mounted to the substrate.

The left optical system 252 converts, by a collimate lens, the imaging light L emitted from the OLED panel 243 into luminous flux in a parallel state, and causes the imaging light L to be incidence on the left light-guiding plate 28. The imaging light L is reflected by a plurality of reflection surfaces within the left light-guiding plate 28, reflected by the half mirror 261 located in front of the left eye LE, and emitted from the left light-guiding plate 28 toward the left eye LE.

The HMD 100 functions as a transmissive display device. Namely, the imaging light L reflected by the half mirror 261 and outside light OL having passed through the right light-guiding plate 26 enter the right eye RE of the user U. The imaging light L reflected by a half mirror 281 and the outside light OL having passed through the half mirror 281 enter the left eye LE. The HMD 100 allows the imaging light L of an internally processed image and the outside light OL to enter the eyes of the user U in an overlapped manner. This allows the user U to see the outside scene through the right light-guiding plate 26 and the left light-guiding plate 28, enabling the image due to the imaging light L to be visually recognized in a manner overlapped with the outside scene. Each of the half mirrors 261 and 281 is an image extracting unit configured to reflect imaging light output by each of the right display unit 22 and the left display unit 24 and extract an image, and configures a display unit.

C. Configuration of Control System of HMD

FIG. 3 is a block diagram of the display system 1, particularly illustrating a configuration of the HMD 100 in detail.

In the image display unit 20, the right display unit 22 includes a right display unit substrate 210. On the right display unit substrate 210, a right I/F unit 211 coupled to the coupling cable 40, a reception unit 213 that receives data input from the connection device 10 via the right I/F unit 211, and an EEPROM 215 are mounted. The right I/F unit 211 couples the reception unit 213, the EEPROM 215, the temperature sensor 217, the DP outer camera 61, the distance sensor 64, the DP illuminance sensor 65, and the LED indicator 67 to the connection device 10. The reception unit 213 couples the OLED unit 221 to the connection device 10.

The left display unit 24 includes a left display unit substrate 230. On the left display unit substrate 230, a left I/F unit 231 coupled to the coupling cable 40, a reception unit 233 that receives data input from the connection device 10 via the left I/F unit 231 are mounted. The left display unit substrate 230 is mounted with a DP six-axis sensor 235 and a DP magnetic sensor 237.

The left I/F unit 231 couples the reception unit 233, the DP six-axis sensor 235, the DP magnetic sensor 237, and the temperature sensor 239 to the connection device 10. The reception unit 233 couples the OLED unit 241 to the connection device 10.

In the descriptions and figures of the present exemplary embodiment, I/F is an abbreviation for interface. EEPROM is an abbreviation for Electrically Erasable Programmable Read-Only Memory. The reception unit 213 and the reception unit 233 may be described as Rx213 and Rx233, respectively.

The EEPROM 215 is configured to store various types of data in a non-volatile manner. The EEPROM 215 stores, for example, data about light-emitting properties and display properties of the OLED units 221 and 241 provided in the image display unit 20, and data about a property of a sensor provided in the right display unit 22 or the left display unit 24. Specifically, parameters regarding gamma correction of the OLED units 221 and 241, data used to compensate for detection values of the temperature sensors 217 and 239, and the like, are stored so as to be readable by the DP control unit 120.

The DP outer camera 61 performs capturing in accordance with a signal input via the right I/F unit 211 and outputs captured image generated by the capturing to the right I/F unit 211. The DP illuminance sensor 65 is configured to receive the outside light and output a detection value corresponding to an amount of the received light or intensity of the received light. The LED indicator 67 is configured to light up in accordance with a control signal or a driving current input via the right I/F unit 211.

The temperature sensor 217 is configured to detect a temperature of the OLED unit 221, and outputs a voltage value or a resistance value corresponding to the detected temperature as a detection value.

The distance sensor 64 is configured to output a signal indicating detection results of distance detection to the connection device 10 via the right I/F unit 211.

The reception unit 213 is configured to receive video data for displaying transmitted from the connection device 10 via the right I/F unit 211, and output the video data to the OLED unit 221. The OLED unit 221 displays video based on the video data transmitted by the connection device 10.

The reception unit 233 is configured to receive video data for displaying transmitted from the connection device 10 via the left I/F unit 231, and output the video data to the OLED unit 241. The OLED unit 221 and 241 displays video based on the video data transmitted by the connection device 10.

The DP six-axis sensor 235 is a motion sensor including a three-axis acceleration sensor and a three-axis gyro sensor. The DP magnetic sensor 237 is a three-axis geomagnetic sensor, for example. The DP six-axis sensor 235 and the DP magnetic sensor 237 may each be an IMU in which each of the sensors described above is modularized, or may be a module in which the DP six-axis sensor 235 and the DP magnetic sensor 237 are integrally modularized. IMU is an abbreviation for Inertial Measurement Unit. The temperature sensor 239 detects a temperature of the OLED unit 241. The DP six-axis sensor 235, the DP magnetic sensor 237, and the temperature sensor 239 each output a detection value to the connection device 10.

Each component of the image display unit 20 operates with power supplied from the connection device 10 via the coupling cable 40. The image display unit 20 includes a power supply unit 229 on the right display unit 22, and a power supply unit 249 on the left display unit 24. The power supply unit 229 is configured to distribute and supply the power supplied by the connection device 10 via the coupling cable 40 to each part of the right display unit 22 including the right display unit substrate 210. The power supply unit 249 is configured to distribute and supply the power supplied by the connection device 10 via the coupling cable 40 to each part of the left display unit 24 including the left display unit substrate 230. The power supply units 229 and 249 may each include a conversion circuit or the like configured to convert a voltage.

The connection device 10 includes an I/F unit 110, the DP control unit 120, a sensor control unit 122, a main control unit 123, a power control unit 126, a non-volatile storage unit 130, an operating unit 140, a connection unit 145, and a sound processing unit 147. Details of the main control unit 123 will be described with reference to FIG. 4. The main control unit 123 is an example of a first control unit of the present disclosure.

The I/F unit 110 includes the connector 11D and an interface circuit configured to execute communication protocols conforming to respective communication standards by the connector 11D. The I/F unit 110 is, for example, an interface substrate on which the connector 11D and the interface circuit are mounted. The I/F unit 110 may include an interface for a memory card capable of being coupled with an external storage device or storage medium, or the like, or the I/F unit 110 may include a radio communication interface.

The DP control unit 120 includes a processor such as a CPU or a microcomputer, and this processor is configured to execute a program to control each component of the connection device 10. The DP control unit 120 may include a RAM configuring a work area for the processor. RAM is an abbreviation for Random Access Memory.

The DP control unit 120 is coupled to the non-volatile storage unit 130, the operating unit 140, the connection unit 145, and the sound processing unit 147. The non-volatile storage unit 130 is a ROM configured to store a program to be executed by the DP control unit 120, and data in a non-volatile manner. ROM is an abbreviation for Read Only Memory.

The sensor control unit 122 operates the respective sensors included in the image display unit 20. Here, the respective sensors refer to the DP outer camera 61, the distance sensor 64, the DP illuminance sensor 65, the temperature sensor 217, the DP six-axis sensor 235, DP the magnetic sensor 237, and the temperature sensor 239. The respective sensors include at least one or more of the DP outer camera 61, the DP illuminance sensor 65, the DP six-axis sensor 235, and the DP magnetic sensor 237. The sensor control unit 122 is configured to perform setting and initialization of a sampling period of each sensor according to control of the DP control unit 120, and execute energization to each sensor, transmission of control data, acquisition of detection values and the like, in correspondence to the sampling period of each sensor.

The sensor control unit 122 outputs detection data indicative of a detection value and a detection result of each sensor to the I/F unit 110 at preset timing. Here, a captured image of the DP outer camera 61 is referred to as detection data in the same manner as detection values and detection results of the other sensors.

The sensor control unit 122 may include an A/D converter to convert analog signals into digital data. In this case, the sensor control unit 122 converts analog signals of detection values and detection results obtained from the sensors of the image display unit 20 into detection data and outputs the detection data. The sensor control unit 122 may acquire digital data of detection values and detection results from the sensors of the image display unit 20, perform a conversion of data format, adjustment of output timing, and the like, and output detection data to the I/F unit 110.

By operation of the sensor control unit 122, the control device 300 coupled to the I/F unit 110 can acquire a detection value of each sensor of the HMD 100, and a captured image of the DP outer camera 61.

The sensor control unit 122 may output results obtained by an arithmetic operation based on detection value of each sensor described above, as detection data. For example, the sensor control unit 122 may be configured to integrally process detection values and detection results of a plurality of sensors, and to function as a so-called sensor fusion processing unit. In this case, the sensor control unit 122 may generate detection data for a virtual sensor not included in the respective sensors of the image display unit 20 by sensor fusion. For example, the sensor control unit 122 may output, as detection data, trajectory data indicating a trajectory along which the image display unit 20 moves, coordinate data indicating a position of the image display unit 20 in a three-dimensional space, and directional data indicating a direction of the image display unit 20. Here, the coordinate data may be data indicating relative coordinates with respect to a position of the connection device 10, or may be data indicating a position with respect to a reference position set in a space in which the image display unit 20 is present. The direction data may be data indicating a direction with respect to a position or a direction of the connection device 10, or may be data indicating a direction with respect to a reference position set in the space in which the image display unit 20 is present.

The sensor control unit 122 executes a communication protocol to and from a device coupled to the connector 11D by the USB cable 46, and outputs detection data.

The sensor control unit 122 and the main control unit 123 may be realized by cooperation of software and hardware by a processor executing a program. That is, the sensor control unit 122 and the main control unit 123 are configured by a processor to execute a program to execute the operations described above. In this example, the sensor control unit 122 and the main control unit 123 may be realized by a processor constituting the DP control unit 120 executing a program. In other words, the processor may function as the DP control unit 120, the main control unit 123 and the sensor control unit 122 by executing the program. Here, the processor can be paraphrased as a computer. Each of the sensor control unit 122 and the main control unit 123 may include a work memory for executing data processing, and may execute processing by using a memory of the DP control unit 120.

Further, the main control unit 123 and the sensor control unit 122 may include programmed hardware such as DSP, FPGA. The sensor control unit 122 and the main control unit 123 may be integrated to be configured of an SoC-FPGA. DSP is an abbreviation for Digital Signal Processor, FPGA is an abbreviation for Field Programmable Gate Array, and SoC is an abbreviation for System-on-a-Chip.

The power control unit 126 is a circuit that is coupled to the connector 11D, and based on power supplied from the connector 11D, supplies power to each component of the connection device 10 and to the image display unit 20.

The operating unit 140 is configured to detect operation on a switch and the like included in the connection device 10 and outputs data indicating an operation content to the DP control unit 120.

The sound processing unit 147 is configured to generate a sound signal according to sound data that is input from the DP control unit 120, and output the sound signal to the connection unit 145. This sound signal is output from the connection unit 145 to the right earphone 32 and the left earphone 34 via the audio connector 36. The sound processing unit 147 is configured to generate sound data of the sound collected by the microphone 63, and output the sound data to the DP control unit 120. The sound data output by the sound processing unit 147 may be processed by the sensor control unit 122 in the same manner as detection data of the sensor included in the image display unit 20.

D. Configuration of Control Device and Main Control Unit

Figure 4:
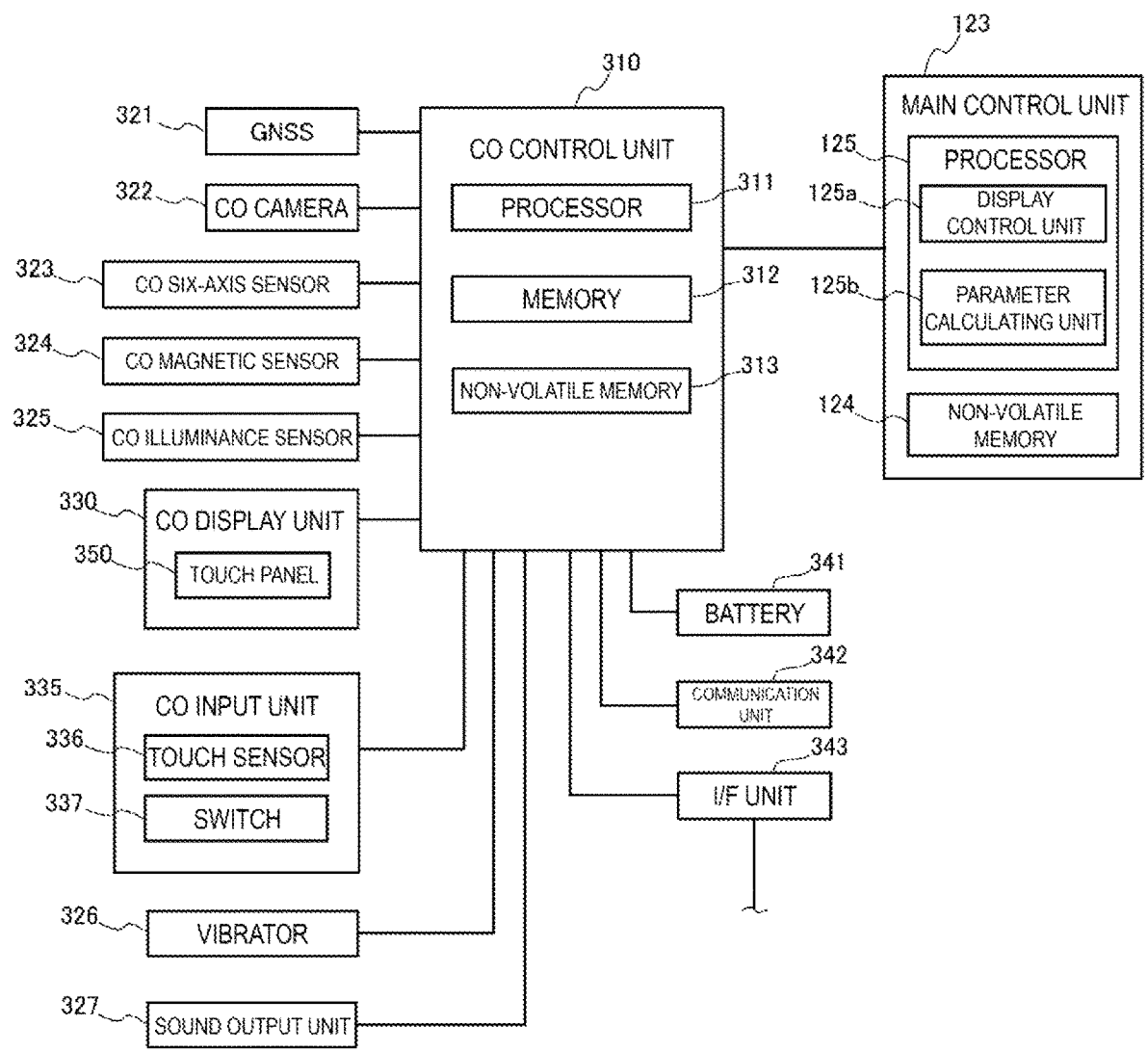
FIG. 4 is a block diagram of a control device and a main control unit.

FIG. 4 is a block diagram illustrating a configuration of the control device 300 and, the main control unit 123 included in the connection device 10.

First, the control device 300 will be described.

The control device 300 includes a CO control unit 310. The CO control unit 310 is an example of a second control unit of the present disclosure. The CO control unit 310 includes a processor 311, a memory 312, and a non-volatile memory 313. The processor 311 is configured with a CPU, a microcomputer, a DSP, and the like, and is configured to execute a program to control each unit of the control device 300. The memory 312 forms a work area of the processor 311. The non-volatile memory 313 is configured with a semiconductor memory device or the like, and stores a program executed by the processor 311, and various kinds of data to be processed by the processor 311. For example, the non-volatile memory 313 stores an operating system as basic control programs to be executed by the processor 311, and application programs operating on the operating system. The non-volatile memory 313 is configured to store data processed during execution of the application program, data of processing results, and the like. The operating system is abbreviated as OS below.

The CO control unit 310 may be an SoC integrating the processor 311, the memory 312, and the non-volatile memory 313.

A GNSS 321, a CO camera 322, a CO six-axis sensor 323, a CO magnetic sensor 324, a CO illuminance sensor 325, a vibrator 326, a sound output unit 327, a CO display unit 330 and a CO input unit 335 are coupled to the CO control unit 310.

The GNSS 321 uses a satellite positioning system to perform positioning, and outputs a position of the control device 300 to the CO control unit 310. GNSS is an abbreviation for Global Navigation Satellite System.

The CO camera 322 is a digital camera provided at a main body of the control device 300, and is arranged adjacent to the touch panel 350, for example, and captures a direction facing the touch panel 350. The CO camera 322 is configured to capture an image in accordance with a control by the CO control unit 310, and output captured image to the CO control unit 310.

The CO six-axis sensor 323 is a motion sensor including a three-axis acceleration sensor and a three-axis gyro sensor, and outputs detection data indicating detection values to the CO control unit 310. The CO magnetic sensor 324 is, for example, a three-axis geomagnetic sensor, and outputs detection data indicating detection values to the CO control unit 310. The CO six-axis sensor 323 and the CO magnetic sensor 324 may each be an IMU in which each of the sensors described above is modularized, or may be a module in which the CO six-axis sensor 323 and the CO magnetic sensor 324 may be integrally modularized.

The CO illuminance sensor 325 is configured to receive the outside light and output detection data indicating a detection value corresponding to an amount of the received light or an intensity of the received light to the CO control unit 310.

The vibrator 326 generates vibration in accordance with control of the CO control unit 310, and causes a part or all of the main body of the control device 300 to vibrate. The vibrator 326 is configured to include, for example, an eccentric weight and a motor.

The sound output unit 327 is provided with a speaker, and outputs sound from the speaker according to the control of the CO control unit 310. The sound output unit 327 may include an amplifier that amplifies a sound signal output by the CO control unit 310 and outputs the amplified sound signal to a speaker. When the CO control unit 310 is configured to output digital sound data, the sound output unit 327 may include a D/A converter that converts digital sound data to an analog sound signal.

The CO display unit 330 has the touch panel 350, and displays characters and images on the touch panel 350 in accordance with the control of the CO control unit 310. The touch panel 350 is an example of a second display unit of the present disclosure, and is an example of an accepting unit of the present disclosure.

The CO input unit 335 is configured to detect operations on the touch sensor 336 and the switch 337, and output operation data indicating the detected operations to the CO control unit 310. The touch sensor 336 is arranged on a surface of the touch panel 350 in an overlapped manner. The touch sensor 336 detects a contact operation or a pressing operation by the user U. The switch 337 is a hardware switch such as, for example, a power switch or a volume adjustment switch of the control device 300. The switch 337 may be a contact or non-contact sensor, and for example, may be a fingerprint sensor or the like embedded in the touch panel 350. Alternatively, the switch 337 may be a software switch formed utilizing a part or all of the touch sensor 336.

A battery 341, a communication unit 342, and an I/F unit 343 are coupled to the CO control unit 310.

The battery 341 is a secondary battery built into the main body of the control device 300, and supplies power to each unit of the control device 300. The battery 341 may include a control circuit (not illustrated) that controls power output and charging to the secondary battery.

The communication unit 342 supports a wireless communication protocol such as Bluetooth or Wi-Fi, and performs wireless communication with a device external to the display system 1. Bluetooth and Wi-Fi are registered trademarks. The communication unit 342 may be configured to perform mobile data communication using a mobile communication network such as LTE or a fifth-generation mobile communication system. LTE is a registered trademark.

The I/F unit 343 includes a connector (not illustrated) to which a data communication cable is coupled, and an interface circuit configured to execute communication protocols conforming to respective communication standards by the connector. For example, the I/F unit 343 includes a connector and an interface circuit conforming to a USB standard and transmits and receives data through the USB cable 46.

In the present exemplary embodiment, the control device 300 transmits video data to the HMD 100 via the I/F unit 343, and receives detection data of the sensors from the HMD 100. The control device 300 supplies power to the HMD 100 via the I/F unit 343.

A configuration will be illustrated in which, the I/F unit 343 of the present exemplary embodiment includes a USB interface, and the control device 300 transmits and receives data with the HMD 100 using the USB cable 46 coupled to the I/F unit 343.

The control device 300 may perform wireless data communication with the HMD 100 by the communication unit 342, for example.

Next, the main control unit 123 will be described.

The main control unit 123 includes a non-volatile memory 124 and a processor 125.

The non-volatile memory 124 is configured with a semiconductor memory device or the like, and stores a program executed by the processor 125, and various kinds of data to be processed by the processor 125.

The processor 125 is configured with a CPU, a microcomputer, a DSP, and the like, and is configured to execute a program to control the connection device 10.

The main control unit 123 includes a display control unit 125a and a parameter calculating unit 125b as function blocks.

The display control unit 125a is configured to execute various kinds of processing for the image display unit 20 to display an image based on display data or display control data input to the I/F unit 110. The display data includes, for example, video data. In the present exemplary embodiment, video data is transmitted through the connector 11D constituted by a USB-TypeC connector in the alternate mode of the USB-TypeC. For example, the display control unit 125a is configured to execute various kinds of processing such as cutting out of a frame, resolution conversion, scaling, intermediate frame generation, and frame rate conversion. The display control unit 125a is configured to output video data corresponding to the OLED units 221 and 241 to the connection unit 145. The video data input to the connection unit 145 is transmitted as a video signal 201 from the connector 11A to the right I/F unit 211 and the left I/F unit 231. The display control unit 125a causes the right display unit 22 and the left display unit 24 to display an image in accordance with display data transmitted by the control device 300. The display control unit 125a adjusts and changes a display state of the image display unit 20 in accordance with the display control data input to the I/F unit 110.

In addition, the display control unit 125a causes the image display unit 20 to display a left eye marker image MG2 and a right eye marker image MG3. The left eye marker image MG2 and the right eye marker image MG3 are images displayed when calibration for correctly determining a spatial relationship between the DP outer camera 61 and the image display unit 20 is performed, in order to cause an AR image to correctly overlap an object in a real space.

The parameter calculating unit 125b calculates parameters that specify the spatial relationship between the DP outer camera 61 and the image display unit 20, in order to cause the AR image to correctly overlap the object in the real space. The parameter calculating unit 125b will be described in detail later. AR is an abbreviation for Augmented Reality. The AR image is an image displayed by the imaging light L emitted by the OLED panels 223 and 243, and incident on the right eye and left eye of the user U by the right light-guiding plate 26 and the left light-guiding plate 28.

The display system 1 includes two modes of a mirroring display mode and an expanded display mode, as display modes. The expanded display mode is an example of a first display mode of the present disclosure, and the mirroring display mode is an example of a second display mode of the present disclosure.

The mirroring display mode is a mode in which the same image as an image that the user U wearing the image display unit 20 visually recognizes through the right display unit 22 and the left display unit 24 is displayed on the touch panel 350. The image visually recognized by the user U here also includes the outside scene, that is, an object in the real space. Specifically, a captured image by the DP outer camera 61 is displayed on the touch panel 350 as an image of the outside scene visually recognized by the user U. In addition, when the image display unit 20 displays an AR image on a display region 200, the same image as the AR image is also displayed on the touch panel 350. The AR image displayed on the touch panel 350 is displayed so as to overlap the captured image of the DP outer camera 61.

The display region 200 refers to a range in which the user U can visually recognize the imaging light L emitted by the OLED panels 223 and 243 and incident on the right eye and left eye of the user U by the right light-guiding plate 26 and the left light-guiding plate 28. In other words, the display region 200 refers to a region in which the image display unit 20 can display an AR image that is a display image.

Figure 5:
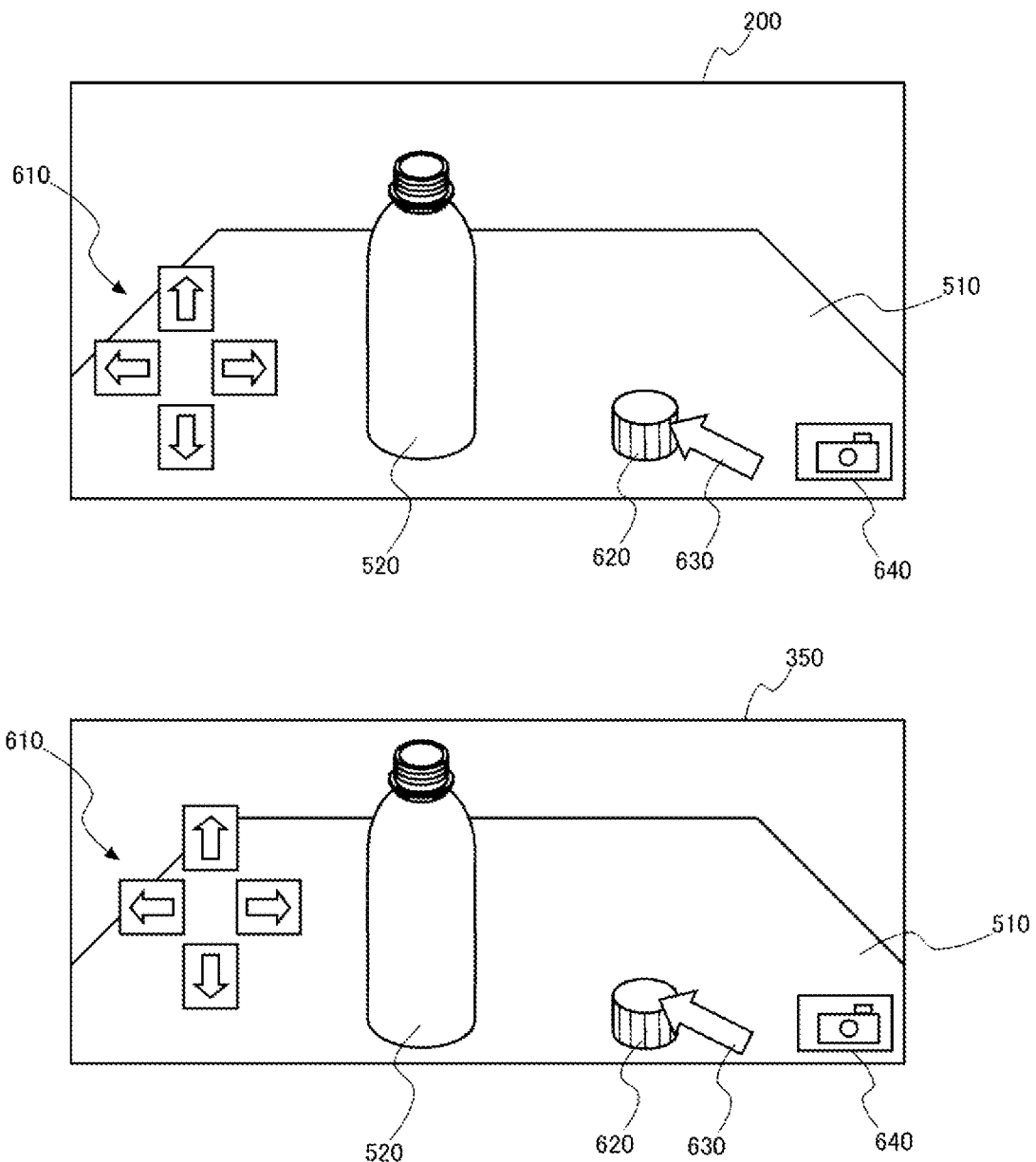
FIG. 5 is a diagram illustrating an example of display images displayed on a display region and a touch panel respectively.

FIG. 5 is a diagram illustrating images displayed on the display region 200 and the touch panel 350 respectively, when the display mode is the mirroring display mode. An image displayed on the display region 200 by the image display unit 20 is illustrated on an upper side of FIG. 5, and an image displayed on the touch panel 350 of the control device 300 is illustrated on a lower side of FIG. 5.

In the display example of the mirroring display mode illustrated in FIG. 5, a desk 510 and a bottle 520 are visually recognized as objects in the real space by the user U wearing the image display unit 20. Additionally, as AR images displayed by the image display unit 20, a cross key 610, a cap 620, a cursor 630, and a camera icon 640 are visually recognized by the user U. The cross key 610 is an image for accepting operation for changing a display position of the cursor 630. The camera icon 640 is an image for accepting operation that causes the DP outer camera 61 to perform capturing.

Images of the desk 510, the bottle 520, the cross key 610, the cap 620, the cursor 630, and the camera icon 640 are also displayed on the touch panel 350. The images of the desk 510 and the bottle 520 are displayed by the CO control unit 310 acquiring a captured image of the DP outer camera 61 from the main control unit 123 and displaying the captured image on the touch panel 350. Further, the images of the cross key 610, the cap 620, the cursor 630, and the camera icons 640 are displayed by the CO control unit 310 displaying an image based on display data serving as an origin of the AR image on the touch panel 350. The display data may be acquired from the main control unit 123 by the CO control unit 310, or the CO control unit 310 may read display data previously stored in the non-volatile memory 313 and cause an image based on the read display data to be displayed on the touch panel 350.

The expanded display mode is a mode in which the display region 200 of the image display unit 20 and the touch panel 350 of the control device 300 are used as one screen.

Figure 6:
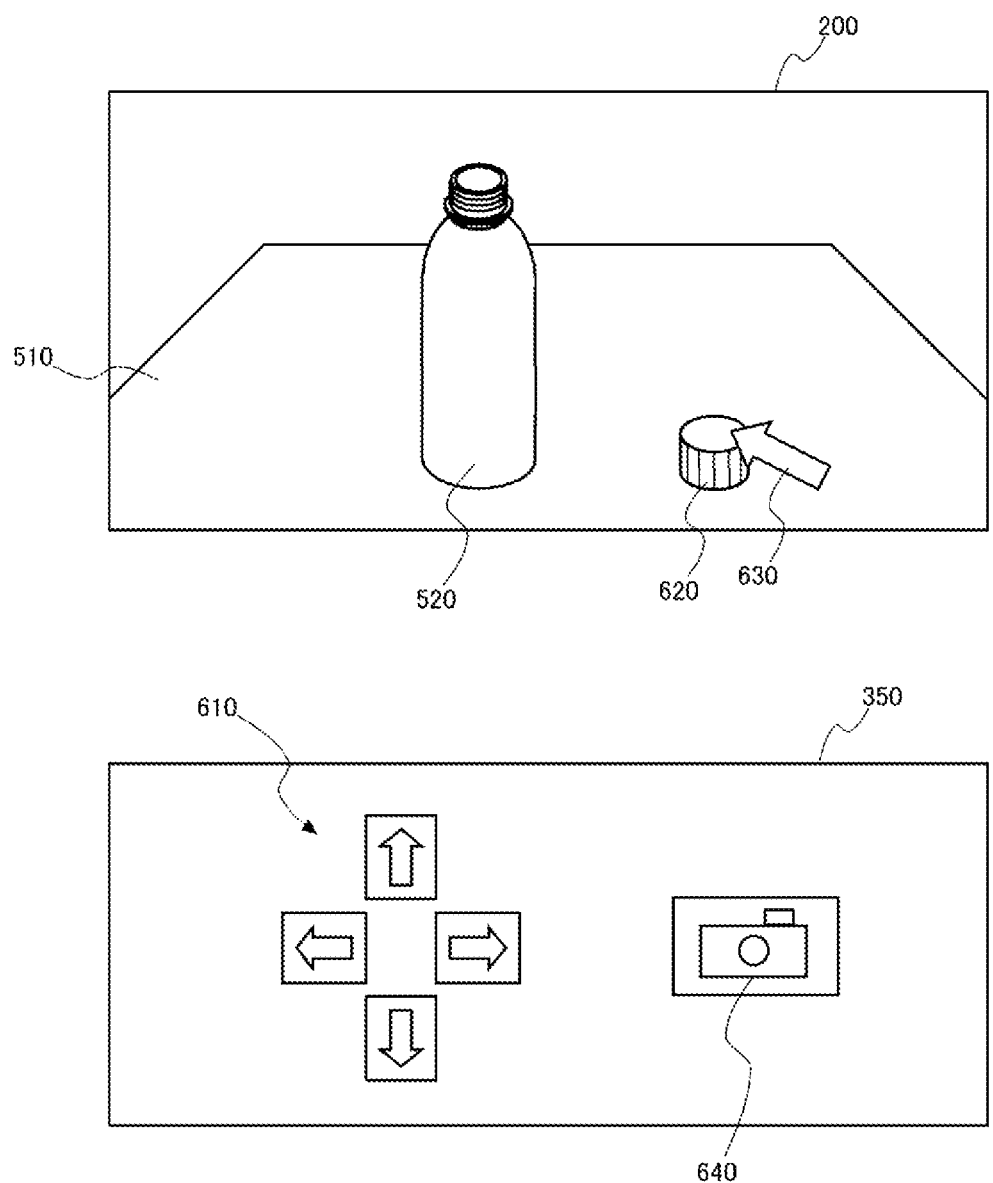
FIG. 6 is a diagram illustrating an example of display images displayed on the display region and the touch panel respectively.

FIG. 6 is a diagram illustrating images displayed on the display region 200 and the touch panel 350 respectively, when the display mode is the expanded display mode. The image displayed on the display region 200 by the image display unit 20 is illustrated on an upper side of FIG. 6, and the image displayed on the touch panel 350 of the control device 300 is illustrated on a lower side of FIG. 6.

In the display example of the expanded display mode illustrated in FIG. 6, the desk 510 and the bottle 520 are visible as objects in the real space, and the cap 620 and the cursor 630 are visible as AR images, to the user U wearing the image display unit 20. Additionally, the cross key 610 and the camera icon 640 are displayed on the touch panel 350.

The display system 1 of the present exemplary embodiment causes a related image related to an AR image displayed as a display image on the display region 200 to be displayed on the touch panel 350. The related image is an image used in processing performed by the control device 300 or the HMD 100. For example, when an AR image displayed on the display region 200 is an image operated by the user U, an operation image for accepting operation by the user U is displayed on the touch panel 350. The operation image is an image for accepting operation by the user U, and is an image for causing the control device 300 to perform processing corresponding to the received operation. The operation image is an example of the related image of the present disclosure.

For example, as illustrated in FIG. 6, it is assumed that the AR image displayed in the display region 200 is the image of the cap 620, and the user U operates the cursor 630 to attach the cap 620 to the bottle 520. The cross key 610 is displayed as the operation image on the touch panel 350. The user U operates the cross key 610 to change a display position of the cursor 630. The display position of the cursor 630 is changed, thereby changing a display position of the cap 620. The user U operates the cross key 610 to move the cap 620 to a cap attaching position of the bottle 520.

Additionally, examples of a case in which a related image related to an AR image displayed on the display region 200 is displayed on the touch panel 350 include an image displayed while calibration is performed. The calibration is a process for correctly determining a spatial relationship between the DP outer camera 61 and the image display unit 20, in order to correctly superimpose an AR image on an object as a target in the real space. In the calibration, calibration images are displayed on the display region 200 and the touch panel 350, and the HMD 100 performs processing based on these calibration images, and calculates parameters for determining the spatial relationship between the DP outer camera 61 and the image display unit 20. The calibration image is an image for causing the HMD 100 to perform the calibration to calculate the parameter.

A procedure for the calibration will be described with reference to FIGS. 7 to 10.

Figure 7:
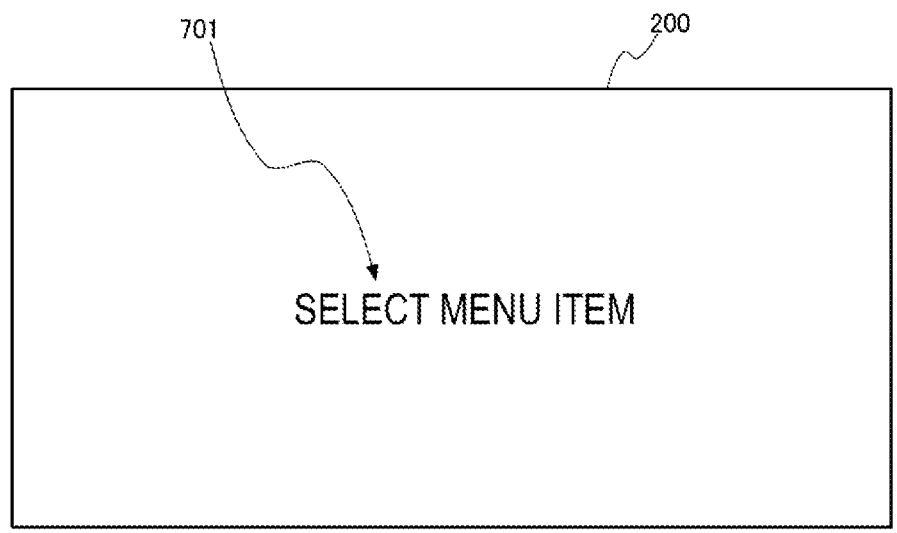
FIG. 7 is a diagram illustrating an example of display images displayed on the display region and the touch panel respectively.
Figure 7:
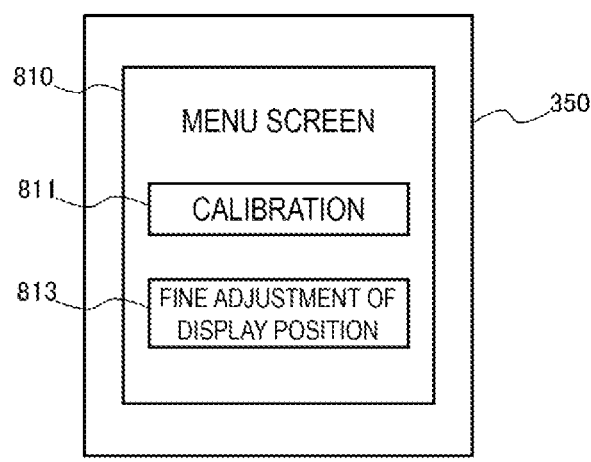

FIG. 7 is a diagram illustrating initial screens displayed on the display region 200 and the touch panel 350 respectively.

On the touch panel 350, as the initial screen, a menu screen 810 on which menu items 811 and 813 are displayed is displayed, and on the display region 200, as the initial screen, a guide display 701 is displayed that performs guiding for the menu item of the menu screen 810 displayed on the touch panel 350 to be selected. The menu item 811 is an item for selecting the calibration, and the menu item 813 is an item for selecting the adjustment of a display position. The menu screen 810 is an operation image for accepting operation.

Figure 8:
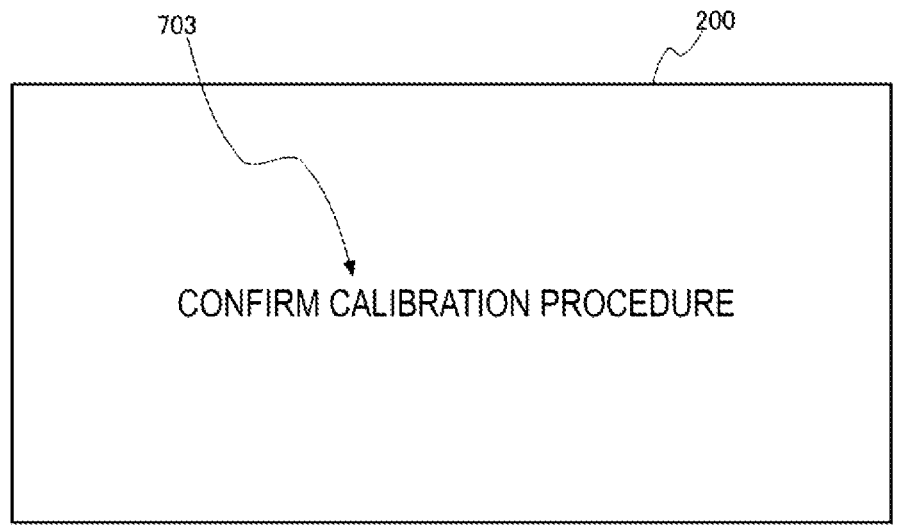
FIG. 8 is a diagram illustrating an example of display images displayed on the display region and the touch panel respectively.
Figure 8:
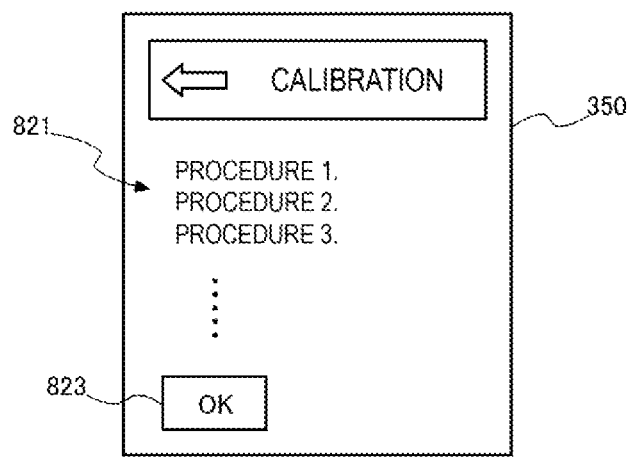

FIG. 8 is a diagram illustrating an example of screens displayed on the display region 200 and the touch panel 350 respectively, when the menu item 811 for selecting the calibration is selected.

On the touch panel 350, a description 821 in which a procedure for the calibration is described, and an OK button 823 are displayed. In addition, on the display region 200, a guide display 703 prompting to confirm the description 821 displayed on the touch panel 350 is displayed.

Figure 9:
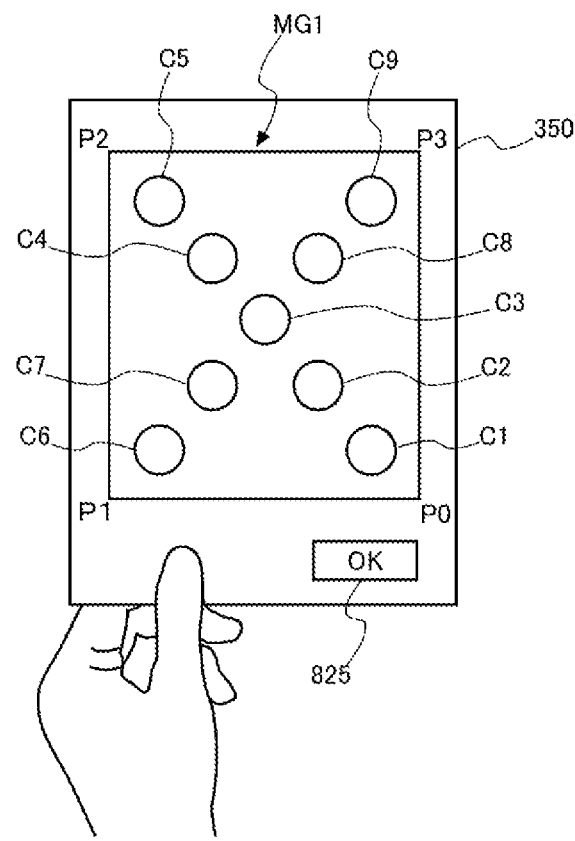
FIG. 9 is a diagram illustrating an example of display images displayed on the display region and the touch panel respectively.
Figure 9:
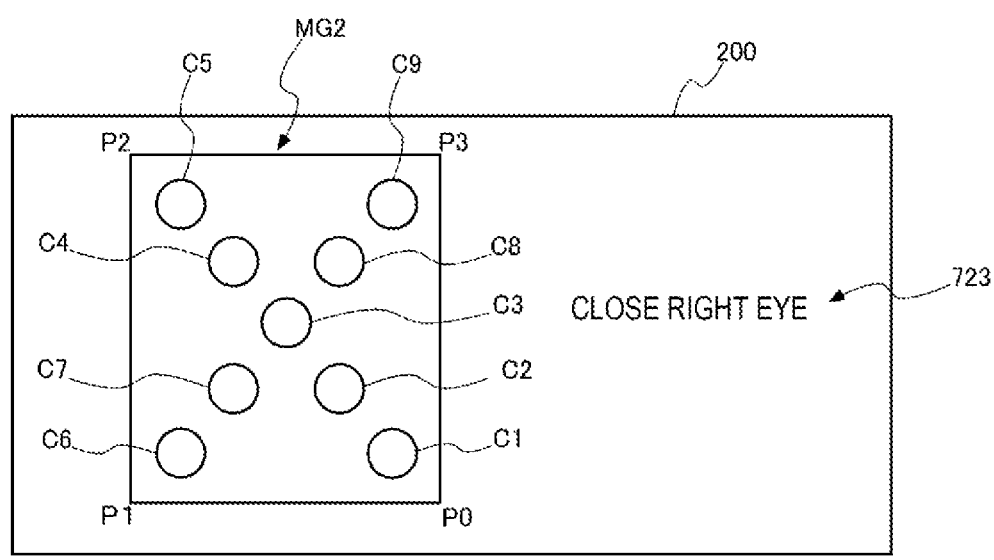

FIG. 9 is a diagram illustrating an example of screens displayed on the display region 200 and the touch panel 350 respectively, when the OK button 823 displayed on the touch panel 350 is depressed.

When the OK button 823 is depressed, the CO control unit 310 causes a marker image MG1 and an OK button 825 illustrated in FIG. 9 to be displayed on the touch panel 350. The marker image MG1 is an image for the calibration, and is an example of the related image of the present disclosure. The OK button 825 is an operation button for accepting operation by the user U.

Here, the marker image MG1 will be described. The marker image MG1 is an example of a second marker image of the present disclosure. The marker image MG1 has a plurality of circles C1 to C9.

The marker image MG1 includes the nine perfect circles C1 C2, C3, C4, C5, C6, C7, C8, and C9 in a square obtained by connecting four vertices P0, P1, P2, and P3 by straight lines. On a diagonal connecting the vertex P0 and the vertex P2, the five circles C1, C2, C3, C4, and C5 are arranged. Also, on a diagonal connecting the vertex P1 and the vertex P3, the five circles C6, C7, C3, C8, and C9 are arranged.

Furthermore, when the OK button 823 is depressed, the CO control unit 310 outputs a display instruction of the left eye marker image MG2 to the main control unit 123. When the display instruction is input from the CO control unit 310, the main control unit 123 controls the image display unit 20 to cause the left eye marker image MG2 to be displayed on the display region 200. A shape of the left eye marker image MG2 is an image having the same shape as the marker image MG1 displayed on the touch panel 350. The left eye marker image MG2 is an image for the calibration, and is an example of a first marker image of the present disclosure.

In addition to the left eye marker image MG2, a guide display 723 is displayed on the display region 200. In the guide display 723, a guide view, such as "CLOSE RIGHT EYE" is displayed, when the calibration for the left eye is performed.

When the marker image MG1 is displayed on the touch panel 350, and the left eye marker image MG2 is displayed on the display region 200, the user U closes the right eye in accordance with the guide display 723, and moves a hand holding the control device 300 so that the marker image MG1 overlaps the left eye marker image MG2. The user U depresses the OK button 825, when the marker image MG1 overlaps the left eye marker image MG2. When the OK button 825 is depressed, the CO control unit 310 instructs the main control unit 123 to perform capturing by the DP outer camera 61. The main control unit 123 causes the DP outer camera 61 to perform capturing by control of the DP control unit 120. A captured image that the DP outer camera 61 generates by capturing is output as a left eye captured image to the main control unit 123. Upon completion of the imaging by the DP outer camera 61, the main control unit 123 outputs a notification of the capturing completion to the CO control unit 310.

When receiving the notification of the capturing completion from the CO control unit 310, the CO control unit 310 outputs a display instruction of the right eye marker image MG3 to the main control unit 123. The main control unit 123 controls the image display unit 20 to cause the right eye marker image MG3 to be displayed on the display region 200.

Figure 10:
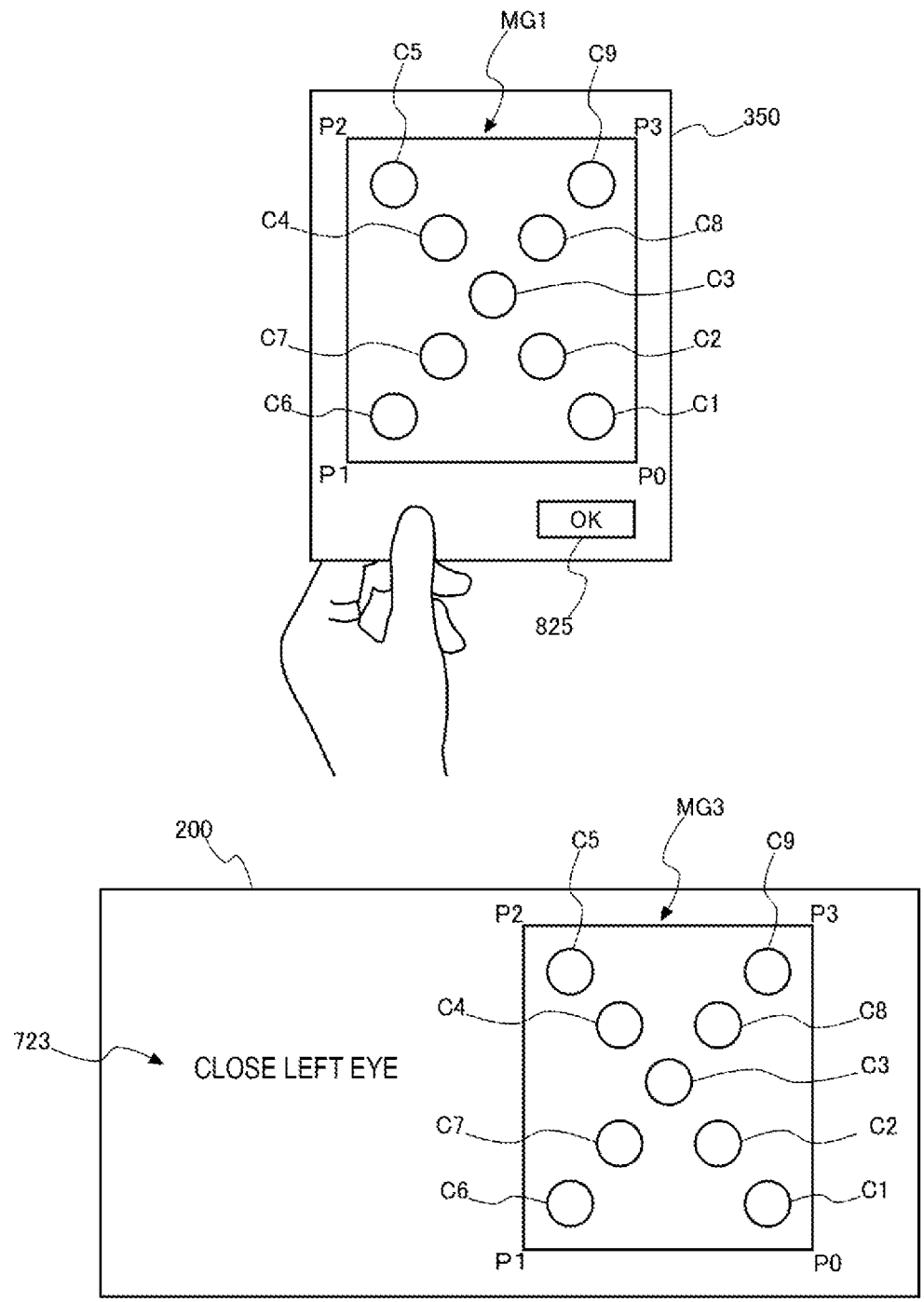
FIG. 10 is a diagram illustrating an example of display images displayed on the display region and the touch panel respectively.

FIG. 10 is a diagram illustrating an example of the right eye marker image MG3. The right eye marker image MG3 is an image having the same shape as the marker image MG1 and the left eye marker image MG2. The right eye marker image MG3 is an example of the first marker image of the present disclosure. The guide display 723 is also displayed on the display region 200.

When the marker image MG1 is displayed on the touch panel 350, and the right eye marker image MG3 is displayed on the display region 200, the user U closes the left eye in accordance with the guide display 723, and moves the hand holding the control device 300 so that the marker image MG1 overlaps the right eye marker image MG3. The user U depresses the OK button 825, when the marker image MG1 overlaps the right eye marker image MG3. When the OK button 825 is depressed, the CO control unit 310 instructs the main control unit 123 to perform capturing by the DP outer camera 61. The main control unit 123 causes the DP outer camera 61 to perform capturing by control of the DP control unit 120. A captured image that the DP outer camera 61 generates by capturing is output as a right eye imaging image to the main control unit 123.

The parameter calculating unit 125*b* uses the left eye captured image and the right eye captured image input from the DP outer camera 61 to calculate a first conversion parameter representing a spatial relationship (at least one of rotation and translation) between the DP outer camera 61 and the touch panel 350 by nomography. The first conversion parameter is a matrix-type variable that converts a coordinate system of the touch panel 350 to a camera coordinate system, which is a coordinate system of the DP outer camera 61.

Additionally, the parameter calculating unit 125*b* uses the left eye captured image and the right eye captured image to calculate second conversion parameters representing spatial relationships between the DP outer camera 61, and the right display unit 22 and the left display unit 24 respectively. The second conversion parameters include a second left display parameter, which is a matrix-type variable for converting the camera coordinate system, which is the coordinate system of the DP outer camera 61, to a coordinate system of the left display unit 24, and a second right display conversion parameter, which is a matrix-type variable for converting the camera coordinate system of the DP outer camera 61 to a coordinate system of the right display unit 22. The second left display parameter corresponds to a first parameter. The second right display parameter corresponds to a second parameter.

Further, the parameter calculating unit 125*b* optimizes the parameters related to the DP outer camera 61. In the optimization of the parameters related to the DP outer camera 61, calculation is performed such that parameters including a parameter related to a focal length of the DP outer camera 61 that is not known in advance, and a principal point location (for example, center coordinates of a captured image), and the like, can be optimized using the obtained coordinate values. When a target object is captured using the parameters derived by the optimization and a captured image is acquired, a position of the target object in the captured image, and a display position on the image display unit 20 overlapping the target object when viewed from the user U will be associated with each other. As a result, the user U can visually recognize, via the image display unit 20, that an AR image matches the target object in at least one of a position, a size, and posture.

Figure 11:
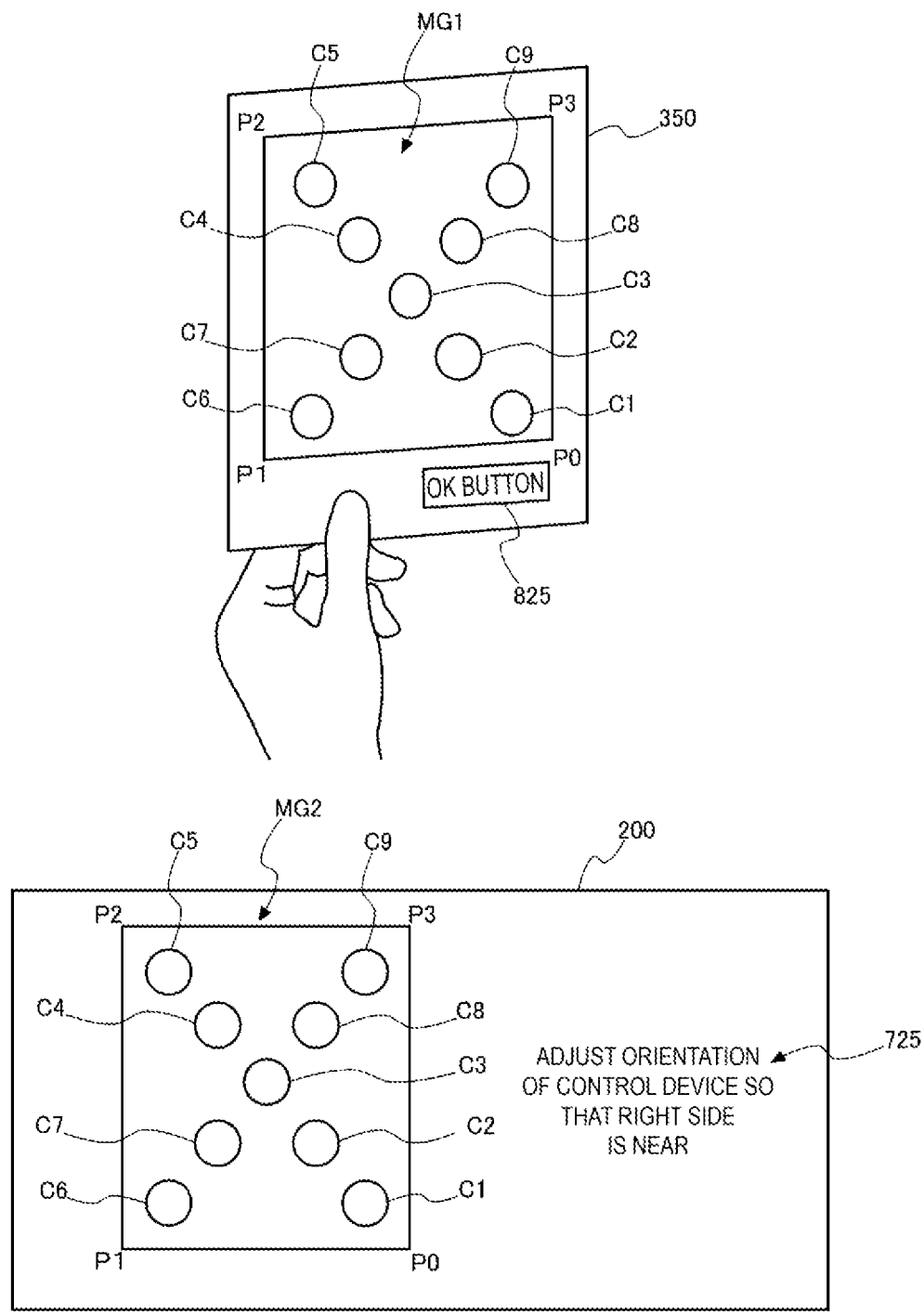
FIG. 11 is a diagram illustrating a guide display for guiding posture of the touch panel with respect to the image display unit.

Further, upon detecting the marker image MG1 from the captured image of the DP outer camera 61, the parameter calculating unit 125*b* may determine posture of the control device 300 relative to the image display unit 20, based on shapes of the respective circles C1 to C9 included in the marker image MG1. For example, the parameter calculating unit 125*b* calculates circularity of the circles C1 to C9, and determines the posture of the control device 300 relative to the image display unit 20 based on the calculated circularity. Then, when determining that the control device 300 and the image display unit 20 do not face each other, the parameter calculating unit 125*b* may cause the image display unit 20 to display a guide display 725 for guiding the posture of the control device 300, as illustrated in FIG. 11.

Additionally, in the present exemplary embodiment, the marker image MG1 displayed on the touch panel 350 as the second marker image, and the left eye marker image MG2 and the right eye marker image MG3 displayed on the display region 200 as the first marker images are formed in the same shape, but the marker image MG1, the left eye marker image MG2, and the right eye marker image MG3 may have different shapes. For example, shapes may be used that form a square, when the marker image MG1 and the left eye marker image MG2 and the right eye marker image MG3 overlap each other.

Here, operation for changing the display mode of the display system 1 from the expanded display mode to the mirroring display mode, or from the mirroring display mode to the expanded display mode will be described.

In a state in which the display mode of the display system 1 is the expanded display mode, when detecting a touch operation on the touch panel 350, for example, a swiping operation, the CO control unit 310 changes the display mode to the mirroring display mode. In addition, in a state in which the display mode of the display system 1 is the mirroring display mode, when detecting a touch operation on the touch panel 350, the CO control unit 310 changes the display mode to the expanded display mode. When detecting the touch operation, the CO control unit 310 instructs the main control unit 123 to switch the display mode.

In addition, the switching of the display mode may be performed by the main control unit 123 based on a sound input from the microphone 63, or may be performed by the main control unit 123 according to operation accepted by the operating unit 140. When a preset gesture is detected from a captured image of the DP outer camera 61, the main control unit 123 may switch the display mode to the expanded display mode or mirroring display mode.

E. Operation

Figure 12:
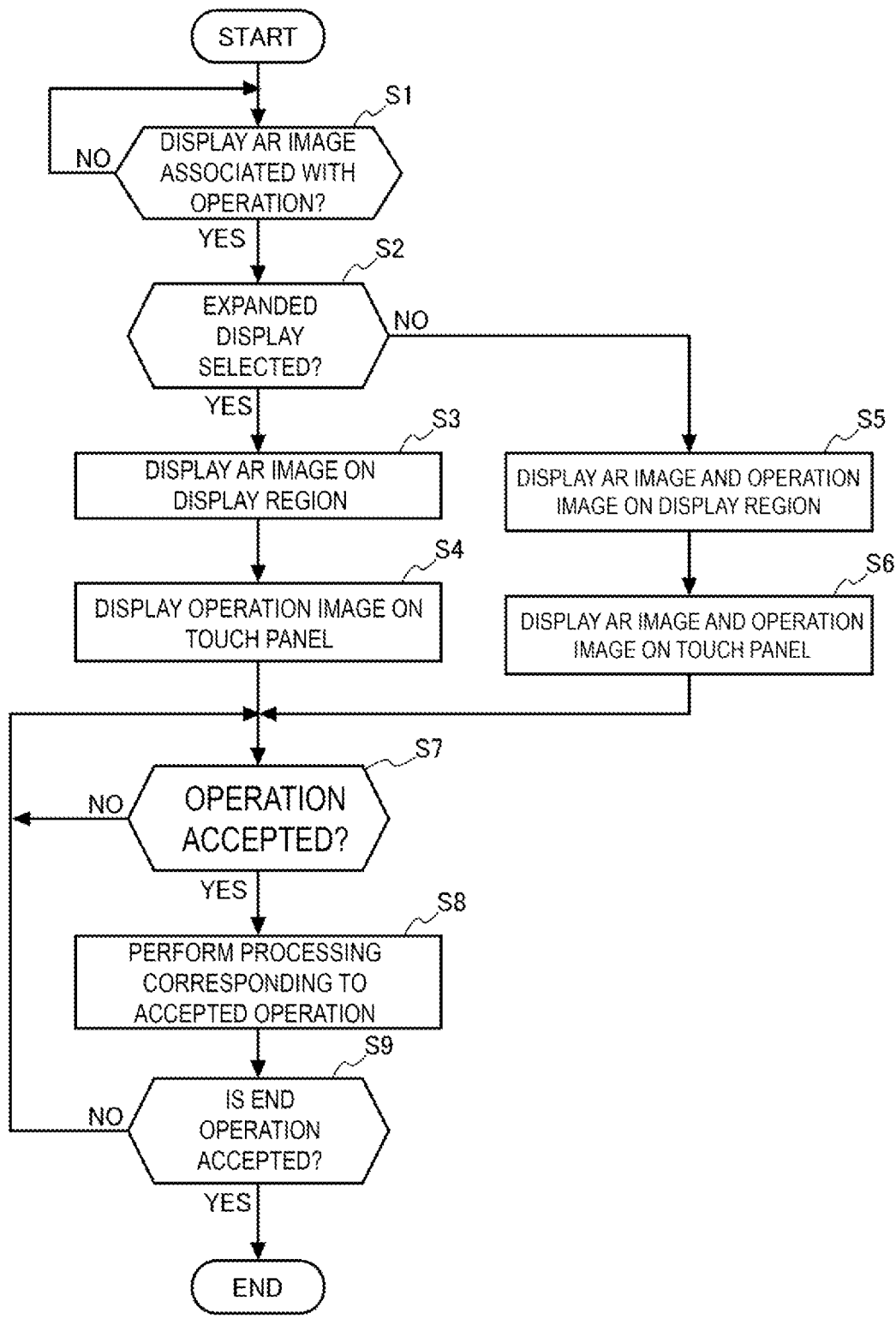
FIG. 12 is a flowchart illustrating operation of the control device when an AR image is displayed.

FIG. 12 is a flowchart illustrating operation of the control device 300, when an AR image associated with operation by the user U is displayed on the display region 200.

First, the CO control unit 310 determines whether operation for displaying an AR image associated with operation by the user U is accepted or not (step S1). When the operation for displaying the AR image is not accepted (step S1/NO), the CO control unit 310 waits until the operation is accepted.

When the operation for displaying the AR image is accepted (step S1/YES), the CO control unit 310 determines whether an expanded display is selected or not (step S2). The determination of step S2 may be performed in accordance with preset setting information, or operation by the user U may be accepted.

Next, when the expanded display is selected (step S2/YES), the CO control unit 310 outputs an instruction to the main control unit 123 for causing the selected AR image to be displayed on the display region 200. When the instruction is input from the CO control unit 310, the main control unit 123 causes the AR image to be displayed on the display region 200 (step S3). In addition, the CO control unit 310 causes an operation image to be displayed on the touch panel 350 (step S4).

Additionally, in the determination of step S2, when the expanded display is not selected (step S2/NO), the CO control unit 310 outputs an instruction to the main control unit 123 for causing the selected AR image and the operation image to be displayed on the display region 200. When the instruction is input from the CO control unit 310, the main control unit 123 causes the AR image and the operation image to be displayed on the display region 200 (step S5). Further, the CO control unit 310 causes the selected AR image and the operation image to be displayed on the touch panel 350 (step S6).

Next, the CO control unit 310 determines whether an operation on the operation image displayed on the touch panel 350 is accepted or not (step S7). When the operation is not accepted (step S7/NO), the CO control unit 310 waits until the operation on the operation image is accepted. When the operation is accepted (step S7/YES), the CO control unit 310 performs processing corresponding to the accepted operation (step S8). For example, when the operation accepted in step S7 is operation for selecting an arrow indicating an upward direction of the cross key 610, the CO control unit 310 outputs an instruction to the main control unit 123 for causing a display position of the AR image to be moved in an upward direction of the display region 200.

Next, the CO control unit 310 determines whether an end operation is accepted or not (step S9). When the end operation is not accepted (step S9/NO), the CO control unit 310 returns to the determination in step S7 to again determine whether the operation is accepted or not. Further, when the end operation is accepted (step S9/YES), the CO control unit 310 ends the flow of processing.

Figure 13:
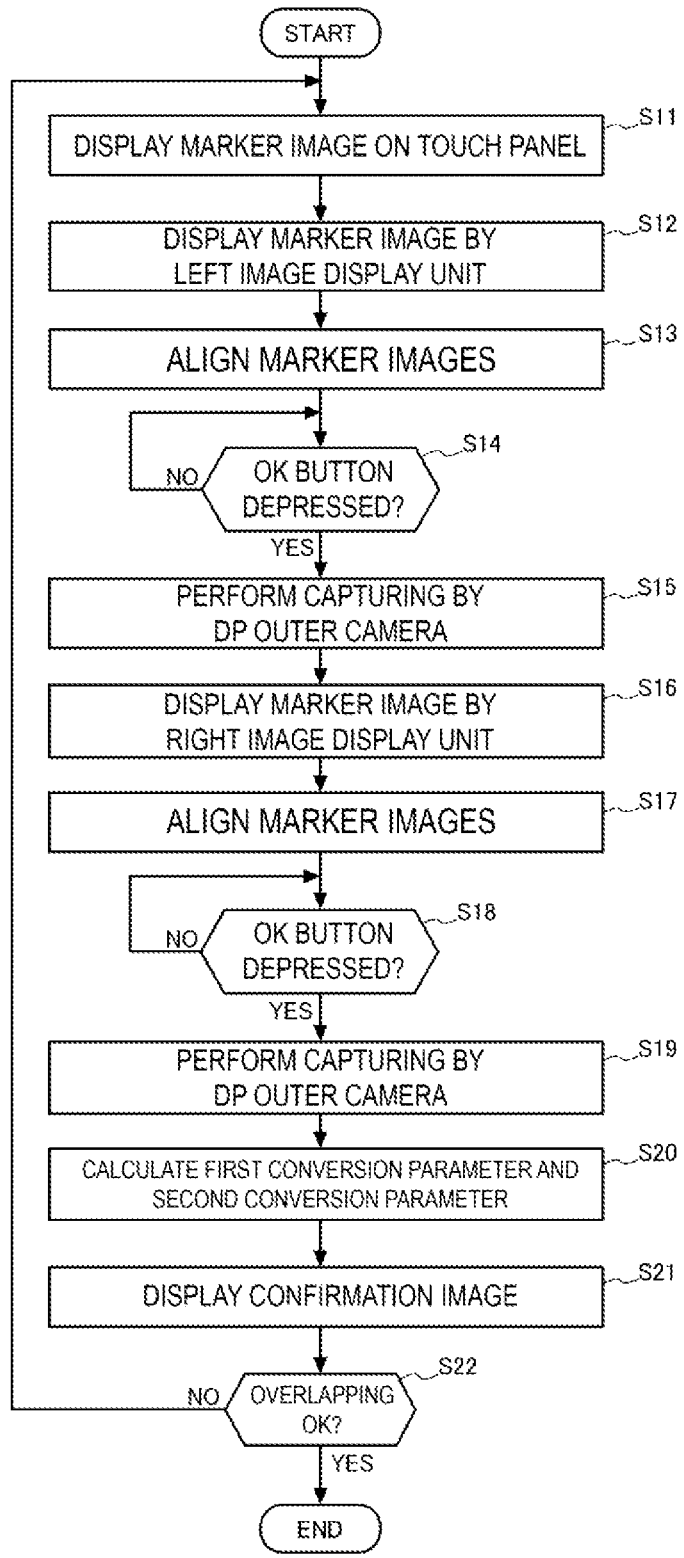
FIG. 13 is a flowchart illustrating a procedure for calibration.

FIG. 13 is a flowchart illustrating a procedure for processing calibration.

The procedure for processing calibration will be described with reference to the flowchart illustrated in FIG. 13.

The CO control unit 310 causes the marker image MG1 to be displayed on the touch panel 350 (step S11). Next, the main control unit 123 causes the left display unit 24 to display the left eye marker image MG2 by control of the DP control unit 120 (step S12). The user U moves the control device 300 held in the hand to align the marker image MG1 displayed on the touch panel 350 so as to overlap the left eye marker image MG2 displayed by the left display unit 24 (step S13). When the marker image MG1 overlaps the left eye marker image MG2, the user U depresses the OK button 825.

When the OK button 825 is depressed (step S14/YES), the CO control unit 310 instructs capturing by the DP outer camera 61 to the main control unit 123. The main control unit 123 causes the DP outer camera 61 to perform capturing by control of the DP control unit 120 (step S15) to generate a left eye captured image.

Next, the main control unit 123 causes the right display unit 22 to display the right eye marker image MG3 by control of the DP control unit 120 (step S16). The user U moves the control device 300 held in the hand to align the marker image MG1 displayed on the touch panel 350 so as to overlap the right eye marker image MG3 displayed by the right display unit (step S17). When the marker image MG1 overlaps the right eye marker image MG3, the user U depresses the OK button 825.

When the OK button 825 is depressed (step S18/YES), the CO control unit 310 instructs capturing by the DP outer camera 61 to the main control unit 123. The main control unit 123 causes the DP outer camera 61 to perform capturing by control of the DP control unit 120 (step S19) to generate a right eye captured image.

Next, the main control unit 123 acquires the left eye captured image and the right eye captured image captured by the DP outer camera 61, and uses the acquired left eye captured image and the right eye captured image to calculate a first conversion parameter representing a spatial relationship between the DP outer camera 61 and the marker image MG1 by nomography. Additionally, the parameter calculating unit 125b calculates second conversion parameters representing spatial relationships between the DP outer camera 61, and the right display unit 22 and the left display unit 24 respectively (step S20). The second conversion parameters include a second left display parameter, which is a matrix-type for converting a camera coordinate system, which is a coordinate system of the DP outer camera 61, to a coordinate system of the left display unit 24, and a second right display conversion parameter, which is a matrix-type for converting the camera coordinate system of the DP outer camera 61 to a coordinate system of the right display unit 22.

After calculating the first conversion parameter and the second conversion parameter, the main control unit 123 causes a confirmation image to be displayed on the display region 200 so as to overlap the marker image MG1 in accordance with a position of the marker image MG1, to be confirmed by the user U (step S21). When the confirmation image is displayed at a position overlapping the marker image MG1, the user U inputs operation indicating overlapping OK into the control device 300. In addition, when the confirmation image is displayed at a position shifted from the marker image MG1, the user U inputs operation indicating overlapping not OK into the control device 300.

When the operation indicating overlapping not OK is accepted (step S22/NO), the CO control unit 310 returns to the process of step S11, which is the first step of the flowchart, and performs the same process again. Further, when the operation indicating overlapping OK is accepted (step S22/YES), the CO control unit 310 ends the flow of processing.

Second Exemplary Embodiment

In the first exemplary embodiment described above, the marker image MG1 is displayed on the touch panel 350 of the control device 300, the user U manually moves the control device 300, and the marker image MG1 is superimposed on the left eye marker image MG2 or the right eye marker image MG3 displayed by the image display unit 20, and capturing is performed by the DP outer camera 61.

In the second exemplary embodiment, calibration is performed using the DP outer camera 61 included in the HMD 100, and the CO camera 322 included in the control device 300, to calculate second conversion parameters representing spatial relationships between the DP outer camera 61, and the right display unit 22 and the left display unit 24 respectively.

Figure 14:
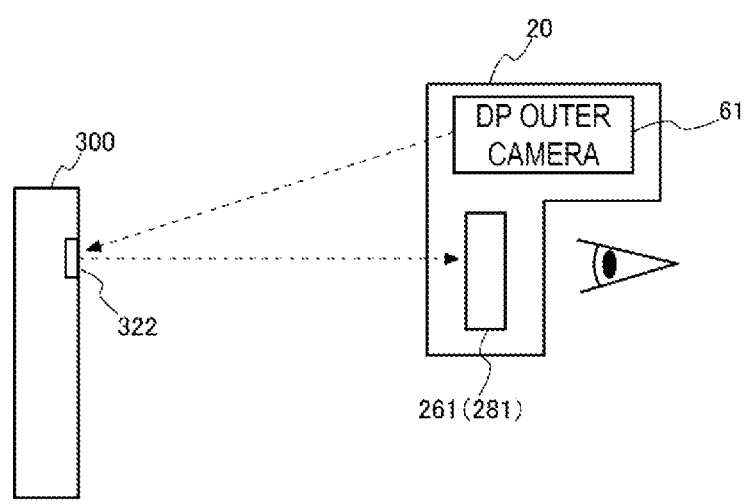
FIG. 14 is an explanatory diagram for explaining a second exemplary embodiment.

FIG. 14 is an explanatory diagram illustrating a calibration method for the second exemplary embodiment.

First, as illustrated in FIG. 14, the user U adjusts an orientation of the control device 300 so that a capturing direction of the CO camera 322 mounted on the control device 300 is in a direction of the user U. At this time, the user U adjusts a position of the control device 300 so that the control unit 300 is included in an imaging range of the DP outer camera 61. Further, the user U adjusts the position of the control device 300 so that the image display unit 20 of the HMD 100 is included in an imaging range of the CO camera 322.

When the control device 300 is included in the imaging range of the DP outer camera 61, the main control unit 123 causes the DP control unit 120 to perform capturing. Timing at which the DP control unit 120 is caused to perform capturing may be timing at which operation by the user U is accepted, or when the DP outer camera 61 is caused to perform capturing along with start of calibration, and the control device 300 is detected, the DP control unit 120 may output a captured image in which the control unit 300 is captured to the main control unit 123.

Next, the CO camera 322 of the control device 300 is caused to perform capturing. The main control unit 123 outputs an instruction to the CO control unit 310, and causes the CO camera 322 to perform capturing. Timing at which the capturing is performed by the CO camera 322 may be timing at which operation by the user U is accepted, or when the CO camera 322 is caused to perform capturing along with start of calibration, and the image display unit 20 is detected from a captured image, the captured image may be extracted and output to the main control unit 123.

The captured image of the DP outer camera 61 and the captured image of the CO camera 322 are input into the main control unit 123.

The main control unit 123 first detects the control device 300 from the captured image of the DP outer camera 61. When the control device 300 is detected, the main control unit 123 locates the CO camera 322 of the control device 300. For example, information indicating a shape and a size of the control device 300, and the position of the CO camera 322 are stored in the non-volatile memory 124 included in the main control unit 123. The main control unit 123 may reference the information stored in the non-volatile memory 124 to locate the CO camera 322. In this way, the main control unit 123 recognizes the position of the CO camera 322 with reference to the position of the DP outer camera 61, that is, the relative position of the CO camera 322 to the DP outer camera 61.

Next, the main control unit 123 detects a position of the half mirror 261 included in the right display unit 22, and a position of the half mirror 281 included in the left display unit 24, from the captured image of the CO camera 322. The half mirror 261 and the half mirror 281 serve as a display for causing the imaging light L to be incident on the right eye and the left eye. Furthermore, the main control unit 123 detects respective positions of the right eye and the left eye of the user U from the captured image of the CO camera 322. In this way, the main control unit 123 can grasp the respective positions of the CO camera 322 of the control device 300, the half mirror 261, the half mirror 281, and the right eye and the left eye that are seen through and the half mirror 261 and the half mirror 281. Based on the information above, the main control unit 123 calculates second conversion parameters representing spatial relationships between the DP outer camera 61, and the right display unit 22 and the left display unit 24 respectively.

Additionally, the second conversion parameter may be calculated by using, in addition to the captured images of the DP outer camera 61 and the CO camera 322, sensor information of the CO six-axis sensor 323 mounted on the control device 300 to calculate a relative angle between the control devices 300 and the HMD 100, and by taking the calculated information into consideration.

Third Exemplary Embodiment

In the first exemplary embodiment, in a state in which the marker image MG1 displayed on the touch panel 350 overlaps the left eye marker image MG2 or the right eye marker image MG3 displayed by the image display unit 20, the marker image MG1 is captured by the DP outer camera 61, and the first conversion parameter and the second conversion parameter are calculated from the captured image.

As a method other than the method for calculating the first conversion parameter and the second conversion parameter from the captured image of the DP outer camera 61, the DP six-axis sensor 235 as a second posture detector mounted on the image display unit 20, the distance sensor 64 as a distance detector, and the CO six-axis sensor 323 as a first posture detector mounted on the control device 300 may be used to calculate the first conversion parameter and the second conversion parameter.

The CO control unit 310 acquires information of three-axis acceleration measured by the DP six-axis sensor 235, and information of three-axis angular velocity from the sensor control unit 122 as posture information of the image display unit 20. Further, the CO control unit 310 acquires distance information measured by the distance sensor 64 from the sensor control unit 122. This distance information indicates a distance from the distance sensor 64 to the control device 300. In other words, a distance from the image display unit 20 to the control device 300 is indicated.

Furthermore, the CO control unit 310 acquires information of three-axis acceleration measured by the CO six-axis sensor 323, and information of three-axis angular velocity as posture information of the control device 300.

The CO control unit 310 detects relative posture of the control device 300 to the image display unit 20, based on the acquired posture information of the image display unit 20, and the posture information of the control device 300. Further, the CO control unit 310 calculates second conversion parameters representing spatial relationships between the image display unit 20, and the right display unit 22 and the left display unit 24 respectively, based on the detected relative posture and the distance information.

Effect

As described above, the display system 1 is the system including the HMD 100 mounted on the head of the user U, and the control device 300 coupled to the HMD 100.

The HMD 100 includes the image display unit 20 displaying, with an outside scene visible, a display image overlapping the outside scene, and the main control unit 123 causing the image display unit 20 to display the image.

Further, the control device 300 includes the touch panel 350, and the CO control unit 310 that causes a related image related to a display content of the display image to be displayed on the touch panel 350.

According to this configuration, the related image related to the display content of the display image displayed by the image display unit 20 is displayed on the touch panel 350, thus convenience for the user U using the display system 1 can be improved.

Furthermore, information can also be displayed on the touch panel 350 of the control device 300, and thus an amount of information that can be displayed by the entire display system 1 can be increased. Additionally, for example, when character information and the like are displayed on the touch panel 350 of the control device 300, readability of the character information can be improved.

The CO control unit 310 causes an operation image for accepting operation for changing a display position of a display image to be displayed as a related image.

According to this configuration, by operating the operation image displayed on the touch panel 350, the display position of the display image displayed by the image display unit 20 can be changed.

The HMD 100 includes the DP outer camera 61, and the touch panel 350 of the control device 300 functions as the accepting unit for accepting operation by the user U.

The display system 1 includes as the display modes, the expanded display mode, and the mirroring display mode.

The expanded display mode is a display mode in which the image display unit 20 is caused to display a display image on the display region 200, and an operation image is displayed on the touch panel 350.

The mirroring display mode is a mode in which a display image and an operation image are displayed on the display region 200 by the image display unit 20, and a captured image of the outside scene captured by the DP outer camera 61, a display image, and an operation image are displayed on the touch panel 350.

Furthermore, the CO control unit 310 switches between the expanded display mode and the mirroring display mode, based on operation accepted by the touch panel 350.

According to this configuration, variations of the display in the display system 1 can be increased. For example, when the display system 1 is in the mirroring display mode, the user U can recognize a display image displayed by the image display unit 20 by the touch panel 350, even when the image display unit 20 is removed from the head of the user U.

Furthermore, when the display system 1 is in the expanded display mode, information can also be displayed on the touch panel 350 of the control device 300, and thus an amount of information that can be displayed by the entire display system 1 can be increased.

The main control unit 123 displays the left eye marker image MG2 or the right eye marker image MG3, which is preset, as a display image, and the CO control unit 310 displays the marker image MG1 associated in advance with the left eye marker image MG2 or the right eye marker image MG3 as a related image.

The HMD 100 includes the parameter calculating unit 125b. The parameter calculating unit 125b acquires a captured image of the marker image MG1 captured by the DP outer camera 61, while the user U is caused to visually recognize the left eye marker image MG2 or the right eye marker image MG3 so as to overlap the marker image MG1. The control device 300 calculates a parameter indicating a spatial relationship between the image display unit 20 and the DP outer camera 61, based on the acquired captured image.

For example, when paper on which the marker image MG1 is printed is sticked to a wall, and calibration is performed with the left eye marker image MG2 or the right eye marker image MG3 displayed by the image display unit 20, it was necessary to spend time and effort to print the paper on which the marker image MG1 is printed, and to stick the printed paper to the wall.

In contrast, in the present exemplary embodiment, the marker image MG1 is displayed on the touch panel 350 of the control device 300, and the marker image MG1 is superimposed on the left eye marker image MG2 or the right eye marker image MG3 displayed by the image display unit 20. Therefore, it is possible to eliminate the time and effort to print the marker image MG1 on the paper, and to stick the paper on which the marker image MG1 is printed to the wall. In addition, by causing the marker image MG1 having a preset size to be displayed on the touch panel 350, a decrease in accuracy of the calibration can be suppressed.

The parameter calculating unit 125b detects posture of the touch panel 350, based on a captured image of the marker image MG1.

The main control unit 123 causes a guide display for guiding posture of the control device 300 to be displayed on the touch panel 350, based on the posture calculated by the parameter calculating unit 125b.

According to this configuration, a decrease in accuracy of a parameter calculated by calibration can be suppressed. Thus, an AR image displayed by the image display unit 20 can be correctly superimposed on an object in the real space.

The present disclosure is not limited to the configurations in the exemplary embodiments described above, and the present disclosure can be implemented in various aspects without departing from the gist of the disclosure.

For example, the configuration has been illustrated in which the display system 1 includes the head mounted display device HMD 100, but the present disclosure is not limited thereto, and various types of display devices can be employed. For example, instead of the image display unit 20, for example, another type of image display unit such as an image display unit to be worn like a cap, for example, may be employed. Such an image display unit may include a display unit configured to display images corresponding to the left eye LE of the user U and a display unit configured to display images corresponding to the right eye RE of the user U. Additionally, the display device in the disclosure may be configured, for example, as a head mounted display mounted on a vehicle such as a car, and an airplane. Further, the display device may be configured, for example, as a head-mounted display built into a body protector tool such as a helmet. In such a case, a portion for positioning the apparatus with respect to the body of the user U, and a portion positioned with respect to the portion described earlier can be a mounting section of the head-mounted display apparatus.

The HMD 100 is an example of a display device to which the present disclosure is applied, and is not limited to the configuration illustrated in FIG. 3. For example, the configuration in which the image display unit 20 and the connection device 10 are separated has been described as an example in the exemplary embodiment described above, but the connection device 10 and the image display unit 20 may be integrally configured to be mounted on the head of the user U. Further, the configuration of the optical system of the image display unit 20 is optional, and for example, an optical member positioned in front of the eye of the user U and overlapping a part or all of the field of view of the user U may be used. Alternatively, a scanning type optical system may be adopted that makes imaging light by scanning with laser light or the like. Alternatively, in addition to the optical system in which imaging light is guided inside the optical member, an optical system may be used that only has a function of refracting and/or reflecting imaging light to guide toward the eye of the user U.

Further, as the display device, a liquid crystal monitor or a liquid crystal television that displays an image on a liquid crystal display panel may be employed. A display device including a plasma display panel, or an organic EL display panel may be used. Further, as the display device, a projector that projects imaging light onto a screen or the like may be used.

Further, for example, in the HMD 100 illustrated in FIG. 3, the connection device 10 may be configured using a USB-TypeC connector, a USB-TypeC controller, and a USB hub. In this case, the DP outer camera 61 and other sensors may be coupled to the USB hub. Additionally, an FPGA that outputs display data to the right display unit 22 and the left display unit 24 may be arranged, in either the right display unit 22 or the left display unit 24, as a controller for controlling display of the right display unit 22 and the left display unit 24 in the image display unit 20. In this case, the connection device 10 may include a bridge controller that couples the USB-TypeC controller and the FPGA. Additionally, the image display unit 20 may have a configuration in which the DP six-axis sensor 235, the DP magnetic sensor 237, the EEPROM 215, and the like, and the FPGA are mounted on the same substrate. The arrangement of the other sensors can also be changed accordingly. For example, a configuration may be adopted in which the distance sensor 64 and the DP illuminance sensor 65 are arranged at locations suitable for measurement or detection, and coupled to the FPGA or the USB-TypeC controller.

Further, there is no limitation on the specific specifications of the display device including the OLED units 221 and 241, and for example, the OLED units 221 and 241 may have a common configuration.

At least some of the functional blocks illustrated in FIGS. 3 and 4 may be achieved in the form of hardware or may be achieved by a cooperation of hardware and software, and, is not limited to a configuration in which independent hardware resources are arranged as illustrated in the drawings. Further, a configuration may be adopted in which as a program executed by the processor 311, a program stored in an external device is acquired via the communication unit 342 or the I/F unit 343 to be executed.

What is claimed is:

1. A display system, comprising:
a display device that is mounted on a head of a user, the display device including:
 a first display unit displaying a first image and transmitting an outside light, and
 a first control unit causing the first display unit to display the first image; and
an information processing device that is coupled to the display device and that receives information regarding the first image from the display device, the information processing device including:
 a second display unit, and
 a second control unit causing the second display unit to display a second image related to a display content of the first image, the second image including the first image overlapped with an outside image captured by the display device, wherein
the second image is generated by the information processing device based on the information regarding the first image received from the display device.

2. The display system according to claim 1, wherein the second image is an operation image changing a display position of the first image.

3. The display system according to claim 1, wherein the information processing device includes a first posture detector detecting a posture of the information processing device,
the display device includes a second posture detector detecting a posture of the display device, a distance detector detecting a distance between the display device and the information processing device, and a parameter calculating unit,
when the first display unit displays the first image overlapping with the second image, the parameter calculating unit calculates a parameter representing a spatial relationship between the information processing device and the display device based on the posture of the information processing, the posture of the display device, and the distance between the information processing device and the display device.

4. The display system according to claim 2, wherein the display device includes an imaging unit capturing a captured image from an outside scene,
the information processing device includes an accepting unit accepting operation,
the first control unit causes the first display unit to display the first image and the second image and causes the second display unit to display the first image, the second image and the captured image based on operation accepted by the accepting unit.

5. The display system according to claim 1, wherein
the display device includes an imaging unit capturing a captured image from an outside scene and a parameter calculating unit,
when the first display unit displays the first image overlapping with the second image, the parameter calculating calculates a parameter representing a spatial relationship between the first display unit and the imaging unit based on the captured image.

6. The display system according to claim 5, wherein
the first display unit includes a right display unit displaying the first image and a left display unit for displaying the first image
when the left display unit displays the first image overlapping with the second image, the parameter calculating unit calculates a first parameter correcting a position of a display image to be displayed by the left display unit, based on the acquired captured image, and
when the right display unit displays the first image overlapping with the second image, the parameter calculating unit calculates a second parameter correcting a position of a display image to be displayed by the right display unit, based on the acquired captured image.

7. The display system according to claim 5, wherein,
the imaging unit
the parameter calculating unit detects a posture of the second display unit, based on the captured image including the second display unit that display second image captured by the imaging unit, and
the second control unit causes the second display unit to display a guide display guiding the posture of the information processing device, based on the posture of the second display unit calculated by the parameter calculating unit.

8. The display system according to claim 1, wherein
the second image is different from the first image.

* * * * *